United States Patent
Pu et al.

(10) Patent No.: US 9,474,014 B2
(45) Date of Patent: Oct. 18, 2016

(54) METHOD OF PROCESSING RECEIVED DIGITIZED SIGNALS AND MOBILE RADIO COMMUNICATION TERMINAL DEVICE

(71) Applicant: Intel Corporation, Santa Clara, CA (US)

(72) Inventors: Tian Yan Pu, Dresden (DE); Gunnar Nitsche, Radebeul (DE)

(73) Assignee: Intel Corporation, Santa Clara, CA (US)

( * ) Notice: Subject to any disclaimer, the term of this patent is extended or adjusted under 35 U.S.C. 154(b) by 79 days.

(21) Appl. No.: 14/580,252

(22) Filed: Dec. 23, 2014

(65) Prior Publication Data

US 2016/0183170 A1 Jun. 23, 2016

(51) Int. Cl.
*H04W 4/00* (2009.01)
*H04W 48/16* (2009.01)
*H04W 74/00* (2009.01)

(52) U.S. Cl.
CPC ........... *H04W 48/16* (2013.01); *H04W 74/002* (2013.01)

(58) Field of Classification Search
CPC ........... H04L 27/2675; H04L 27/2656; H04L 27/2655; H04L 5/0048; H04L 7/042; H04B 1/70752; H04B 1/70754; H04J 11/0069; H04J 11/0073; H04J 11/0076; H04J 11/0079; H04W 64/00
USPC ......................................................... 455/434
See application file for complete search history.

(56) References Cited

U.S. PATENT DOCUMENTS

| 6,603,819 | B1 * | 8/2003 | Myers | H04L 27/233 375/285 |
| 7,859,463 | B2 * | 12/2010 | Greverie | G01S 13/003 342/453 |
| 9,065,630 | B1 * | 6/2015 | Xiao | H04W 56/0085 |
| 9,203,526 | B2 * | 12/2015 | Grubeck | H04B 15/00 |

(Continued)

FOREIGN PATENT DOCUMENTS

| CN | 102651884 A | 8/2012 |
| EP | 1898531 A2 | 3/2008 |

(Continued)

OTHER PUBLICATIONS

European Search Report for the corresponding European Patent Application 15 19 5499, dated Apr. 12, 2016, 6 pages of Search Report.

(Continued)

*Primary Examiner* — Don N Vo

(57) ABSTRACT

A mobile radio communication terminal device may include at least one circuit configured to perform a method of processing received digitized signals, the method including determining a plurality of cross-correlation coefficients for the received digitized signal. Each of the plurality of cross-correlation coefficients may be determined by cross-correlating the received digitized signal with a respective candidate mobile radio local reference signal out of a plurality of pre-stored candidate mobile radio local reference signals. The at least one circuit may be further configured to select one or more cross-correlation coefficients from the determined plurality of cross-correlation coefficients and perform a mobile radio cell scan based on one or more of the selected cross-correlation coefficients, thereby determining a mobile radio communication network to connect to.

15 Claims, 13 Drawing Sheets

(56) References Cited

U.S. PATENT DOCUMENTS

| | | | |
|---|---|---|---|
| 2004/0071200 A1* | 4/2004 | Betz | H04B 1/70752 |
| | | | 375/152 |
| 2005/0202795 A1 | 9/2005 | Tian et al. | |
| 2011/0134980 A1* | 6/2011 | Lipka | H03G 3/3078 |
| | | | 375/224 |
| 2011/0143773 A1* | 6/2011 | Kangas | G01S 5/02 |
| | | | 455/456.1 |
| 2012/0100880 A1 | 4/2012 | Baek et al. | |
| 2013/0044686 A1 | 2/2013 | Yen | |
| 2013/0273912 A1 | 10/2013 | Xu et al. | |
| 2013/0303179 A1* | 11/2013 | Jitsukawa | H04W 72/0406 |
| | | | 455/450 |
| 2014/0146691 A1 | 5/2014 | Soliman | |
| 2014/0185724 A1 | 7/2014 | Han et al. | |

FOREIGN PATENT DOCUMENTS

| | | |
|---|---|---|
| EP | 2456106 A1 | 5/2012 |
| WO | 2013144680 A1 | 10/2013 |

OTHER PUBLICATIONS

Office Action including Search Report received for the corresponding TW Patent Application No. 104138139, dated Aug. 22, 2016, 5 pages of Office Action, 1 page of Search Report and 8 pages of English translation.

European Search Report received for the corresponding European Patent Application No. 15 19 5499.7, dated Aug. 8, 2016, 14 pages.

* cited by examiner

METHOD OF PROCESSING RECEIVED DIGITIZED SIGNALS AND MOBILE RADIO COMMUNICATION TERMINAL DEVICE

TECHNICAL FIELD

Various aspects of this disclosure relate generally to a method for processing received digitized signals in order to perform mobile radio cell scans and/or carrier aggregation processes.

BACKGROUND

To find all surrounding mobile radio cells, a mobile radio communication terminal device such as a user equipment (UE) usually needs to activate frequency scan and cell scan (also together called Public Land Mobile Network (PLMN) search) procedure in some cases. A typical example is when a user just enters a new country and thus his/her mobile radio communication terminal device does not have any prior knowledge about its surrounding mobile radio communication networks. In these cases, the scan speed may be important, since it directly impacts user experience (a user will probably not be happy if he/she has to wait for a couple of minutes before his/her mobile radio communication terminal device attaches a mobile radio communication network, when for example, he/she walks out of an airplane).

A conventional Public Land Mobile Network (PLMN) search usually consists of two consecutive processes, namely a frequency scan and a mobile radio CELL scan. The frequency scan is performed first for all candidate Enhanced Universal Mobile Telecommunications System (UMTS) Radio Access (E-UTRA) Absolute Radio Frequency Channel Numbers (EARFCNs) to identify frequencies, which most likely contain a mobile radio cell. After the frequency scan, the mobile radio cell scan is performed for each EARFCN in a so-called short list to check whether there exist mobile radio cells or not.

Several factors together usually contribute to the speed of the frequency/cell scan procedure. They are mainly frequency scan time, quality of frequency scan output (i.e. mobile radio cell scan input), and cell scan time per EARFCN.

In the conventional PLMN search method, the time spent on the frequency scan can be quite long when the number of candidate EARFCNs is large. In a Long Term Evolution (LTE) system, 692 total EARFCNs are specified.

In a conventional frequency scan, Received Signal Strength Indication (RSSI)-based frequency scan is used. With RSSI-based frequency scan, time spent during frequency scan is normally short. However, due to its vulnerability to interference from other radio access technology (RAT), the quality of frequency scan output can be quite poor in an LTE mobile radio communication network. Thus, time spent on an entire PLMN search could be quite long and intolerable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Figure 1:
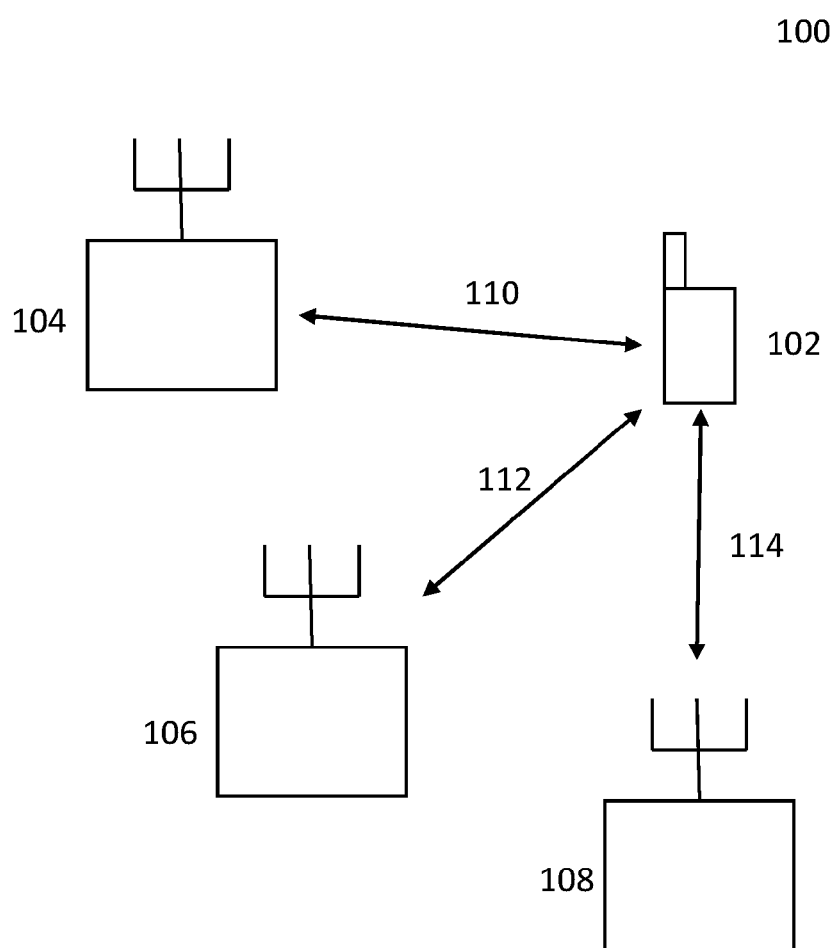
FIG. 1 shows a mobile radio communication system.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

The quality of a frequency scan output for mobile communication may be improved by utilizing a cross-correlation function (CCF) based method to evaluate potential carrier channels. Various aspects of this disclosure may improve the detection accuracy due to potentially increased robustness against interference from other wireless signals.

Similarly, a cross-correlation based method may be provided to evaluate potential carrier channels for a carrier aggregation process. Many of the same effects of utilizing a cross-correlation based method to support a mobile radio cell scan, such as increased robustness against interference, may also be realized in an implementation with a carrier aggregation process.

Various aspects of this disclosure provide one or more post-processing methods to improve the quality of frequency scan output (i.e. mobile radio cell scan or carrier aggregation process input) via efficient evaluation of potential carrier channels in a mobile communication network. This evaluation method may be provided to determine the suitability of candidate Enhanced Universal Mobile Telecommunications System (UMTS) Radio Access (E-UTRA) Absolute Radio Frequency Channel Numbers (EARFCNs) for purposes of communication with a mobile communication device. By way of example, calculations based on cross correlation a received wireless signal and a locally stored reference signal may be used as to predict the potential quality of communications over a carrier channel associated with each respective EARFCN.

This evaluation using cross-correlation may result in improvements in selecting suitable carrier channels. Obtaining an accurate characterization of the quality of a mobile communication link may potentially improve overall communication quality, as it allows for a mobile communication device to select one or more carrier channels with a high likelihood of ultimately providing the highest caliber of communication.

FIG. 1 shows a mobile radio communication system.

FIG. 1 shows a mobile radio communication system 100. Mobile radio communication terminal device 102 such as e.g. User Equipment (UE) 102 receives a plurality of radio signals from one or more base stations such as e.g. NodeBs or eNodeBs 104, 106, and 108, e.g. via respective air interfaces 110, 112, and 114. It is to be noted that although the further description uses a configuration of mobile radio communication system 100 in accordance with Long Term Evolution (LTE) or in accordance with Long Term Evolution Advanced (LTE-A) for explanation, any other mobile radio communication system 100 may be provided, such as any 3GPP ($3^{rd}$ Generation Partnership Project) mobile radio communication system (e.g. in accordance with Universal Mobile Telecommunications System (UMTS)), 4GPP ($4^{th}$ Generation Partnership Project) mobile radio communication system, and the like.

When UE 102 is switched on, it searches for a Public Land Mobile Network (PLMN) to camp on. This PLMN search performed by UE 102 may include a frequency scan procedure and a mobile radio cell scan procedure, as will be described in more detail below. UE 102 may receive a single or a plurality of radio signals (also referred to as radio frequency signals (RF signals)).

Figure 2:
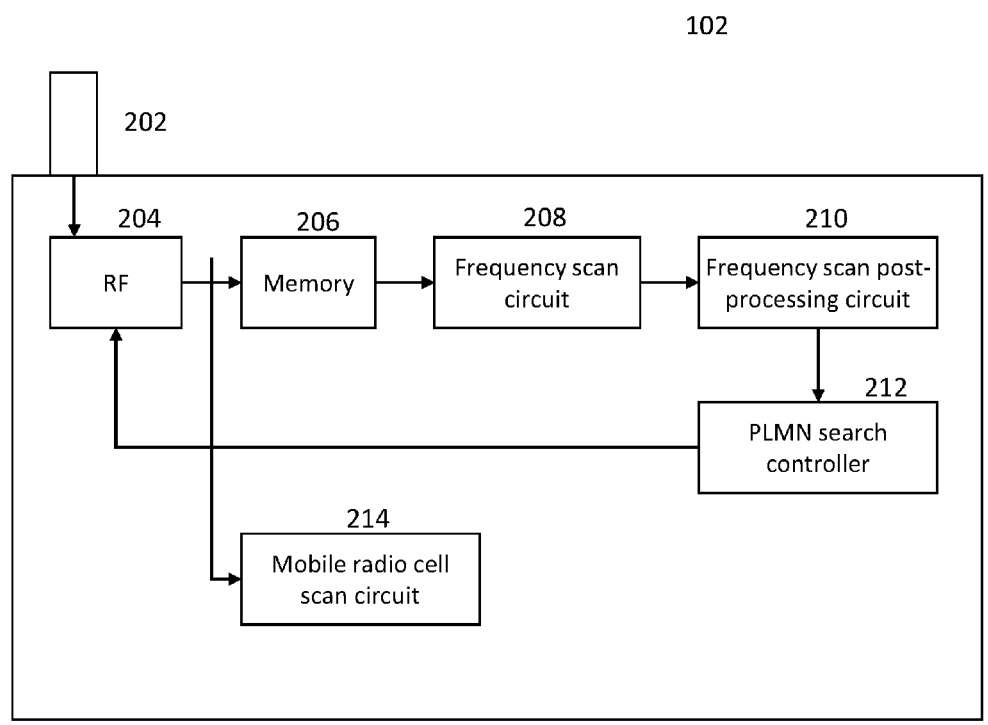
FIG. 2 shows various components and circuits of a mobile radio communication terminal device of FIG. 1.

FIG. 2 shows various components and circuits of UE 102 provided for and used during the PLMN search. As shown in FIG. 2, UE 102 includes one or more antennas 202, via which it receives or transmits RF signals. One or more antennas 202 are shown as coupled with RF transceiver 204, which may be configured to process the received radio signals, to digitize the received radio signals and to provide the digitized received radio signals into memory 206. Memory 206 may be any of a variety of memory types, such as volatile (RAM, DRAM, SRAM, etc.) or non-volatile (ROM, hard drive, optical drive, etc.). Memory 206 may also be implemented as a wideband data buffer. RF transceiver 204 may be configured to provide for the transmission of radio signals by e.g. modulating digital signals to analog RF signals. UE 102 may further include frequency scan circuit 208 (shown as coupled to memory 206), frequency scan post-processing circuit 210 (shown as coupled to frequency scan circuit 208), PLMN search controller 212 (shown as coupled to frequency scan post-processing circuit 210 and to RF transceiver 204), and mobile radio cell scan circuit 214 (shown as coupled to RF transceiver 204). The circuits may be implemented as separate circuits, e.g. as separate integrated circuits. However, some or all of the circuits (e.g. frequency scan circuit 208, frequency scan post-processing circuit 210, PLMN search controller 212, and/or mobile radio cell scan circuit 214) may be implemented by means of one common programmable processor, such as e.g. a microprocessor.

When UE 102 is switched on, it may search for a PLMN to camp on. In order to do this, a PLMN search process is performed as will be described in more detail below. RF transceiver 204 receives radio frequency signals by RF transceiver 204 via one or more antennas 202. RF transceiver 204 may demodulate and digitize the radio frequency signals and may store the demodulated and digitized signals (also referred to as wideband data) in memory 206, e.g. in a wideband data buffer memory. The bandwidth and length of the buffered digitized signals may be dependent on the availability of on-chip memory. During the PLMN search, UE 102 normally does not perform other operations. Therefore, most of on-chip memories (e.g. HARQ memory) may be used for buffering the digitized signals.

Furthermore, frequency scan circuit 208 may perform a frequency scan process using the stored (e.g. buffered) digitized signals. The frequency scan method may use a time-domain cross correlation based primary synchronization signal (PSS) search. The buffered wideband digitized signals first pass a frequency rotation block, which rotates the center frequency of the input digitized signals. After frequency rotation, the digitized signals are decimated to determine narrow band digitized signals, in which existing PSS and secondary synchronization signal (SSS) are located and extracted. The effect of using the time-domain cross correlation based frequency scan method is twofold. First, the results from the frequency scan can be reused during mobile radio cell scan stage, since PSS detection is already performed during frequency scan stage. Second, sensitivity can be much higher compared to other scan methods (e.g. an RSSI based method or an auto-correlation based method).

Figure 3:
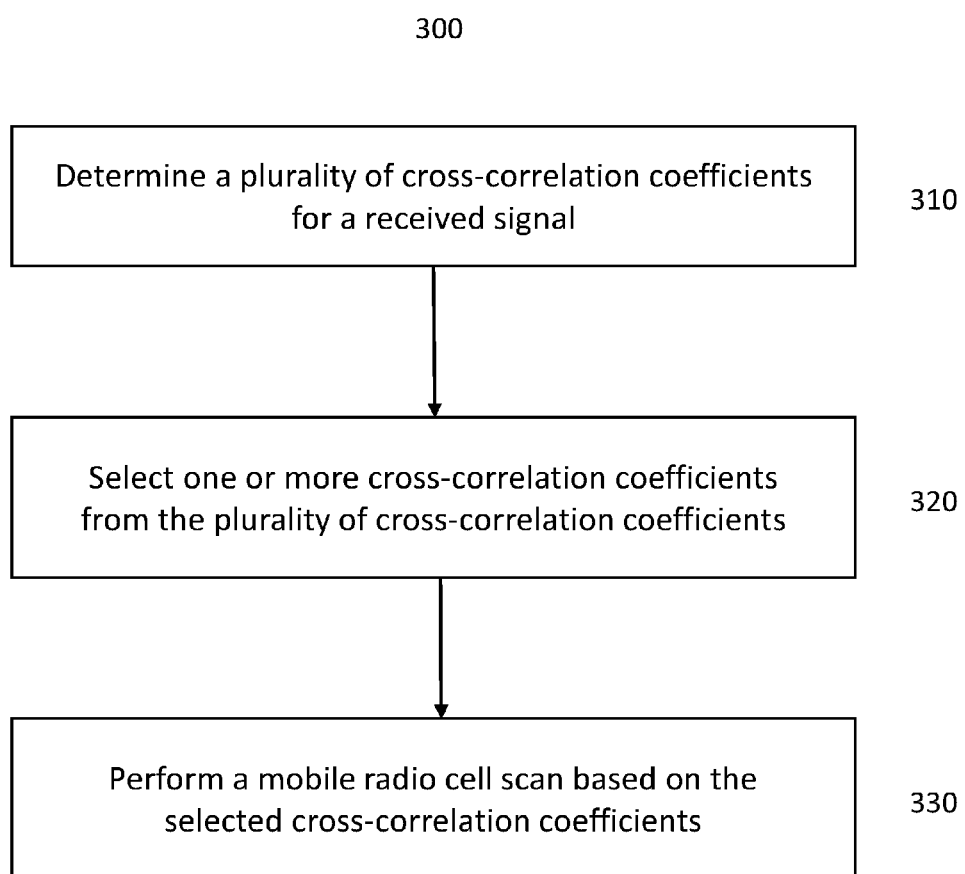
FIG. 3 shows a flow diagram illustrating a method of processing received signals.

FIG. 3 shows a flow diagram illustrating method 300 that details a method for processing a received digitized signals. Method 300 may be a frequency scan process as performed by components of UE 102 such as frequency scan circuit 208 and frequency scan post-processing circuit 210. Method 300 may be performed before the mobile radio cell scan is started.

More particularly, method 300 may include determining a plurality of cross-correlation coefficients for the received digitized signals 310. For example, in 310 method 300 may determine each of the plurality of cross-correlation coefficients by cross-correlating the received digitized signal with a respective candidate mobile radio local reference signal. The respective candidate mobile radio local reference signal may be a candidate mobile radio local reference signal out of a plurality of candidate mobile radio local reference signals. Additionally, the candidate mobile radio local reference signals used in 310 may also be pre-stored. For example, the candidate mobile radio local reference signals may represent signals which are broadcasted from a base station intended for use in organizing or facilitating communication between UE 102 and a base station. Accordingly, UE 102 and one of base stations 104-108 as shown in FIG. 1 may organize communications using the candidate mobile radio local reference signal. The candidate mobile radio local reference signals may be used in either evaluating the suitability of communication with a particular base station or for synchronizing communications with a particular base station. As indicated above, the candidate mobile radio local reference signals may be pre-stored, e.g. may be located in a memory or stored in a buffer. UE 102 may store the candidate mobile radio local reference signals in a memory or buffer. The candidate mobile radio local reference signals may also be stored in an external location, such as at a base station or other core network component, and provided to UE 102 upon request. For example, UE 102 may request the candidate mobile radio local reference signals from the base station or other core component. This may reduce internal memory requirements for UE 102.

As previously detailed, method 300 may include determining a plurality of cross-correlation coefficients for the received digitized signal 310, wherein each of the plurality of cross-correlation coefficients may be determined by cross-correlating the received digitized signal with a respective candidate mobile radio local reference signal out of a plurality of pre-stored candidate mobile radio local reference signals. Method 300 may use a processor or similar processing circuit to calculate a cross-correlation coefficient for the received digitized signal. For example, frequency scan circuit 208 may determine cross-correlation coefficients in 310. Method 300 may determine the cross-correlation coefficients by evaluating the cross-correlation between the received digitized signal and one of the candidate mobile radio local reference signal. The cross-correlation coefficient may reflect a metric representing the similarity between the received digitized signal and a particular one of the candidate mobile radio local reference signals.

Method 300 may include storing the determined cross-correlation coefficients alongside a plurality of other calculated cross-correlation coefficients. Each of these cross-correlation coefficients may be associated with the candidate mobile radio local reference signal which was used in its calculation. For example, a system executing process 300 may include a table that matches cross-correlation values with the candidate mobile radio local reference signals that were used in the cross-correlation calculation. The associated candidate mobile radio local reference signal may be identified in this instance by a numerical identifier, such as an index value that uniquely identifies the candidate mobile radio local reference signal. Information that associates cross-correlation coefficients with candidate mobile radio local reference signals may also be included in a data structure containing both the cross-correlation and an identifier for the candidate mobile radio local reference signal. Alternatively, metadata associated with either a cross-correlation coefficient may include information identifying the corresponding candidate mobile radio local reference signal, or vice versa. After each of the plurality of cross-correlation coefficients have been determined, 320 may include selecting one or more of the plurality of cross-correlation coefficients. UE may perform 320, e.g. using frequency scan post processing circuit 210. In an exemplary aspect, method 300 may select certain cross-correlation coefficients from the plurality of cross-correlation coefficients in 320 based on a predefined metric. For example, in 320 the method 300 may select cross-correlation coefficients which satisfy a predefined threshold from the plurality of cross-correlation coefficients. In 320 method 300 may select one or more maximum-valued cross-correlation coefficients from the determined plurality of cross-correlation coefficients. These maximum-valued cross-correlation coefficients may be associated with the candidate mobile radio reference signals that were found to have the highest similarity with the received digitized signal.

Following selection of one or more cross-correlation coefficients 320, method 300 may perform a mobile radio cell scan in 330 based on the selected cross-correlation coefficients. Method 320 may identify a mobile radio communication network that UE 102 may connect to. For example, the method as illustrated by flow chart 300 may result in the selection of an appropriate carrier channel which mobile communications may be initialized on. Mobile radio cell scan circuit 214 of UE 102 may perform the mobile radio cell scan.

The mobile radio communication network may be a Long Term Evolution (LTE) network. For example, the Long Term Evolution network may be a Long Term Evolution Advanced (LTE-A) network.

One or more of the pre-stored candidate mobile radio reference signals used in 310 may be a plurality of synchronization sequences. For example, one or more of the pre-stored candidate mobile radio reference signals may be a plurality of Primary Synchronization Signals (PSSs). PSSs may be wirelessly transmitted by a base station such as an eNodeB to local UEs. Received PSSs may be used to synchronize communication between a base station and a UE, e.g. one of base stations 104-108 and UE 102. UE 102 may use PSSs in a mobile frequency scan. Note that the use of PSSs is not limiting in this aspect, and other synchronization signals such as Secondary Synchronization Sequences (SSSs) or other broadcast signals may alternatively be used.

In 320, method 300 may select one or more of the cross-correlation coefficients by identifying one or more maximum values of the determined plurality of cross-correlation coefficients. For example, a processor or other processing circuit may evaluate the determined plurality of cross-correlation coefficients to identify one or more maximum valued cross-correlation coefficients. A component such as frequency scan post-processing circuit 210 may perform this operation. A further exemplary aspect may include selecting a carrier channel for a mobile radio cell scan based on the one or more selected cross-correlation coefficients. For example, method 300 may select the carrier channel from a plurality of predefined carrier channels, such as a set of predefined carrier channels which correspond to an Enhanced Universal Mobile Telecommunications System Radio Access Absolute Radio Frequency Channel Number (EARFCN). 330 may perform a mobile radio cell scan based on a select number of candidate EARFCNs. The candidate EARFCNs which are provided to perform the mobile radio cell scan may correspond to candidate mobile radio local reference signals that correspond to maximum valued cross-correlation coefficients.

At least one of the plurality of pre-stored candidate mobile radio reference signals used in 310 may differ from another of the plurality of pre-stored candidate mobile radio reference signals according to a predefined frequency scheme. For example, the candidate mobile radio reference signals may differ from one another in a predefined manner. In an exemplary aspect, the candidate mobile radio reference signals may each be associated with a different frequency.

Accordingly, the different frequencies may be part of a user-defined frequency scheme or grid.

One or more of the pre-stored candidate mobile radio local reference signals may reflect a characteristic of a carrier channel for a radio access network. For example, a frequency characteristic of one or more of the plurality of candidate mobile radio local reference signals may correspond to a frequency associated with a predefined carrier channel for a radio access network. One or more of the plurality of pre-stored candidate mobile radio local reference signals may be a predefined synchronization sequence rotated in frequency according to a predefined frequency scheme.

In summary, an exemplary aspect of the disclosure may include where one or more of the pre-stored candidate mobile radio local reference signals corresponds to a particular carrier channel for a radio access network. For example, the network may define the particular carrier channels to be used with a radio access network, i.e. the carrier channels may be predefined. In an exemplary LTE system, such carrier channels may exist on a 100 kHz carrier grid, i.e. carrier channels may be located at every 100 kHz on the frequency axis. Accordingly, one or more of the pre-stored candidate mobile radio local reference signals may correspond to an LTE carrier channel. As stated in the above exemplary aspect, one or more of the pre-stored candidate mobile radio local reference signals may be a predefined synchronization sequence rotated in frequency according to the a particular carrier channel. This frequency rotation operation may result in a synchronization sequence such as a Primary Synchronization Signal that has been shifted from baseband to be centered at the center frequency of a carrier channel. In essence, this exemplary aspect of the disclosure may result in 310 calculating the cross-correlation between the received signal and a plurality of predefined synchronization sequences which are each centered at a center frequency corresponding to a different pre-defined carrier channel.

For example, the calculation of cross-correlation coefficients in 310 may result in a metric which represents the similarity between the received digitized signal and a synchronization sequence centered at a predefined frequency. This metric may be useful in certain exemplary mobile communication networks in which known synchronization sequences are broadcast at particular carrier frequencies. For example, if a set of predefined synchronization sequences are known to be broadcast at certain carrier frequencies, a UE may perform a search in order to identify which carrier channels are most suitable for mobile communication based on the detection of the synchronization sequences.

Accordingly, method 300 may compare the received digitized signal with multiple reference synchronization sequences (which may all be based on one single reference signal, the center frequency of which may be pre-rotated to derive the multiple reference synchronization sequences). In order to compensate for the fact that the synchronization sequences are broadcast at predefined carrier channels, an exemplary system may shift known synchronization sequences according to a predefined frequency scheme in order to estimate what the actual broadcast synchronization sequence will be when it is wirelessly transmitted over a given carrier channel.

The plurality of pre-stored candidate mobile radio local reference signals may exhibit a degree of similarity when plotted in the frequency domain. For example, a pair of pre-stored candidate mobile radio local reference signals may be separated on the frequency axis by the same distance in frequency as a different pair of pre-stored candidate mobile radio local reference signals. In other words, two pairs of pre-stored candidate mobile radio local reference signals may contain pre-stored candidate mobile radio local reference signals that are separated by the same distance in frequency $f_s$. In certain exemplary aspects, $f_s$ may be in the range from e.g. about 10 kHz to 500 kHz. Accordingly, at least one of the difference between pre-stored candidate mobile radio local reference signals may correspond to a difference between center frequencies of a plurality of predefined carrier channels.

In summary, the above exemplary aspects may be used to select an appropriate carrier channel for mobile communication. An exemplary system such an LTE network, utilizes a predefined set of carrier channels. Therefore, as opposed to searching for suitable carriers over all possible frequencies, a UE searching for a carrier channel may instead evaluate only those carrier channels that are known to be in use. Such carrier channels may be identified as EARFCNs in conventional LTE systems.

In contrast to method 300, a conventional analysis of potential carrier channels may be performed with an RSSI measurement, which measures the energy contained in a single carrier channel. However, this method is susceptible to interference from communications taking place using other radio access technologies, and thus the accuracy of such analysis may be improved.

Accordingly, method 300 may obtain improvements by utilizing alternate methods of channel quality analysis. An exemplary aspect as disclosed may use a cross-correlation measure to evaluate a received synchronization sequence in order to analyze the suitability of potential carrier channels.

As previously detailed, a base station in an exemplary system may wirelessly broadcast at least one signal containing a synchronization sequence to local UEs over a carrier channel. The local UEs may use a received synchronization sequence to organize mobile communications with the base station. Each received PSS will exhibit varying degrees of corruption due to noise and interference. In many cases, the level of corruption due to interference and other unavoidable channel noise is directly representative of the channel quality, i.e. high levels of noise and interference may indicate poor channel quality, while low levels of noise and interference may indicate above-average channel quality. Therefore, a quantitative analysis of the level of corruption in a received PSS may be used to identify strong candidate carrier channels.

In a conventional system, synchronization sequences such as PSSs in LTE networks are predefined, and are therefore known prior to initiation of a communication link. Therefore, a received PSS, which has been corrupted by noise and interference during wireless transmission over a given carrier channel, may be compared with a known PSS in order to analyze the quality of a given carrier channel.

Method 300 may utilize a cross-correlation metric to analyze the similarity between known reference synchronization sequences and a received signal, e.g. a received synchronization signal, thereby obtaining a quantitative indication of channel quality.

However, a conventional process would need to execute an evaluation at every possible frequency in order to analyze every possible carrier channel frequency. For example, the received signal would need to be compared with all candidate synchronization sequences at all candidate carrier channel frequencies. In essence, the synchronization sequences at every possible carrier channel frequency would need to be calculated, which may require significant processing power.

In order to minimize the processing requirements of such an approach, an exemplary aspect of the disclosure may calculate the candidate synchronization sequences before a frequency scan is initiated. These candidate synchronization sequences may be pre-stored and retrieved when needed for calculation, thereby reducing the number of calculations required for each carrier channel analysis.

For example, a synchronization sequence may be represented as $s_{PSS,r}^{k}$, where k corresponds to a numerical identifier associated with a predefined carrier channel and r corresponds to a numerical identifier associated with a specific type of synchronization sequence. For example, k may correspond to an EARFCN hypothesis for an LTE system, while r may identify a particular synchronization sequence. An exemplary LTE system provides three different Primary Synchronization Signals (PSSs) for a given carrier channel in which case r corresponds to the (r=0), (r=1), or (r=2) synchronization sequence. Conventional LTE systems may also provide 692 possible EARFCN hypotheses, i.e. k=1, 2, 3, . . . , 692.

As detailed above, an exemplary aspect of the disclosure may pre-calculate synchronization sequences for a plurality of predefined carrier frequencies. For example, an exemplary aspect may calculate k·r predefined synchronization sequences, wherein each predefined synchronization sequence $s_{PSS,r}^{k}$ represents one of the r=(0, 1, or 2) synchronization sequences centered at a the center frequency of a carrier channel identified by k. In this case, each predefined synchronization sequence is therefore one of the r=(0, 1, or 2) synchronization sequences that has undergone a frequency shift to match its center frequency with that of the $k^{th}$ EARFCN hypothesis. Therefore, each synchronization sequence can be represented as $s_{PSS,r}^{k} = s_{PSS,r} \cdot \omega_{f(k)}$, where $\omega_{f(k)}$ is the frequency shift vector $[1e^{-2\pi i \cdot f(k)} \ldots e^{-2\pi i \cdot (N-1) \cdot f(k)}]$ and f(k) is a function of k which serves as phase step per sample.

Figure 4:
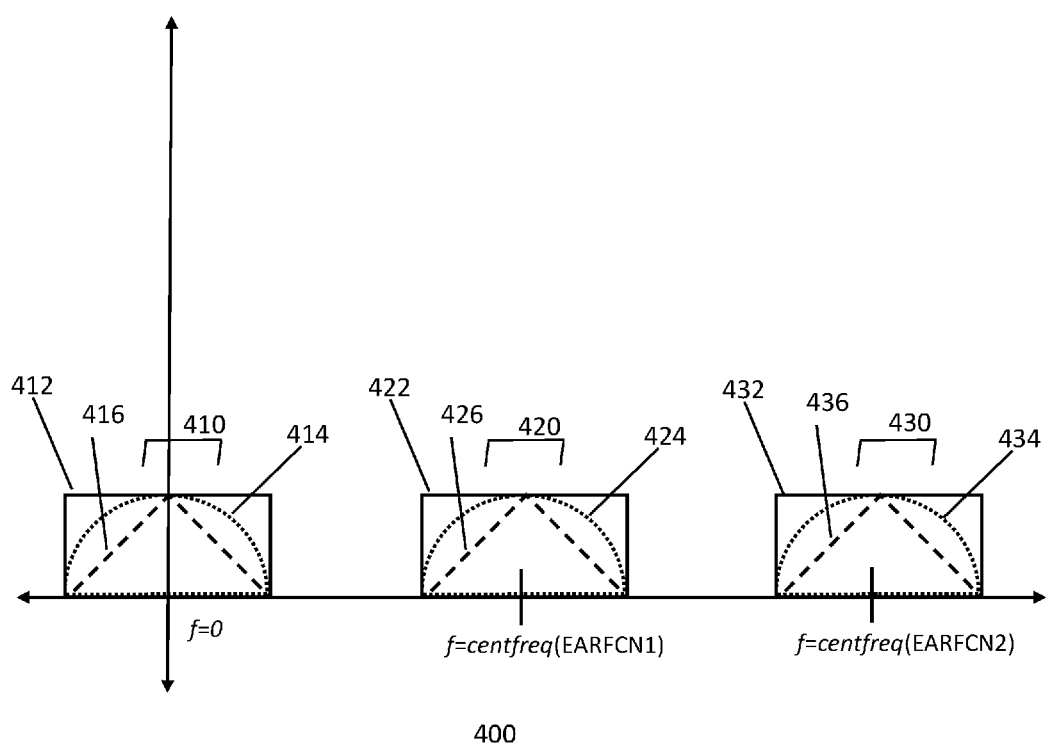
FIG. 4 shows a plurality of local reference signals plotted in the frequency domain.

FIG. 4 shows an exemplary illustration of synchronization sequences, each corresponding to a specific synchronization sequence $s_{PSS,r}^{k}$, as represented in the frequency domain on frequency axis 400. Note that the frequency spectrum of each synchronization sequence in FIG. 4 is exemplary, and is not intended to indicate the actual frequency spectrum of synchronization sequences such as PSS vectors. By contrast, similarly shaped frequency spectra are intended to represent similar synchronization sequences, e.g. frequency spectra characterized by a triangular shape are intended to be derived from substantially the same synchronization sequence. Additionally, frequency axis 400 is not to scale and is not intended to serve as an accurate representation of frequency spacing along its axis.

Regarding FIG. 4, a mobile communication network such as an LTE network may utilize pre-defined synchronization sequences. Base stations such as eNodeBs may wirelessly broadcast these pre-defined synchronization sequences on various carrier channels as defined by the network. Local UEs may then utilize the received synchronization sequences to organize and facilitate with a base station over a particular carrier channel. An exemplary LTE system uses three different baseband PSS vectors, which have been displayed in the frequency domain on frequency axis 400 of FIG. 4 as synchronization sequence $s_{PSS,0}$ (412), synchronization sequence $s_{PSS,1}$ (414), and synchronization sequence $s_{PSS,2}$ (416). Each synchronization sequence 412-416 in sequence grouping 410 is located at baseband frequencies, i.e. has not been rotated or shifted in frequency. Note that there is no k numeral (as in $s_{PSS,r}^{k}$) for each of synchronization sequences $s_{PSS,0}$ 412, $s_{PSS,1}$ 414, or $s_{PSS,0}$ 416, as k is only used to indicate which EARFCN hypothesis the sequence $s_{PSS,r}^{k}$ corresponds to. Synchronization sequences $s_{PSS,0}$ 412, $s_{PSS,1}$ 414, and $s_{PSS,2}$ 416 are baseband, and therefore have not been frequency shifted to correspond with a $k^{th}$ EARFCN hypothesis. However, each synchronization sequence $s_{PSS,0}$ 412, $s_{PSS,1}$ 414, and $s_{PSS,2}$ 416 does have a corresponding r value to indicate one of the r=(0, 1, or 2) synchronization sequences. An LTE carrier channel will use one of three PSSs $s_{PSS,r}$, where r identifies the particular PSS vector.

Sequence grouping 420, however, represents synchronization sequences which have been rotated in frequency according to a $k^{th}$ EARFCN hypothesis. For example, sequence grouping 420 containing synchronization sequences $s_{PSS,0}^{1}$ 422, $s_{PSS,1}^{1}$ 424, and $s_{PSS,2}^{1}$ 426 have each been rotated according to the (k=1) EARFCN hypothesis. Accordingly, each of $s_{PSS,0}^{1}$ 422, $s_{PSS,1}^{1}$ 424, and $s_{PSS,2}^{1}$ are centered at a frequency $f_1$=centfreq($EARFCN_1$) on frequency axis 400, where the operation centfreq($EARFCN_x$) yields the center frequency of the $x^{th}$ EARFCN hypothesis. The frequency $f_1$=centfreq($EARFCN_1$) therefore corresponds to the center frequency of a given EARFCN hypothesis defined by (k=1). Similarly, sequence grouping 430 containing synchronization sequences $s_{PSS,0}^{2}$ 432, $s_{PSS,1}^{2}$ 434, and $s_{PSS,2}^{2}$ 436 are centered at frequency $f_2$=centfreq($EARFCN_2$), as they have been rotated in frequency according to the center frequency of the (k=2) EARFCN hypothesis.

Each synchronization sequence 422-426 and 432-436 therefore represents a baseband synchronization sequence which has been rotated in frequency according to a particular EARFCN hypothesis. As detailed above, synchronization sequences 412-416 have not been rotated in frequency and are therefore baseband synchronization sequences, i.e. are centered around f=0. Accordingly, each synchronization sequence 422-426 and 432-436 represents a candidate synchronization sequence which may hypothetically be broadcast by a base station over a corresponding EARFCN carrier channel. Received synchronization sequences may therefore be compared to one or more or all of the hypothetical synchronization sequences 422-426 and 432-436 in order to determine which actual and hypothetical candidate synchronization sequences are similar. The differences obtained by such a comparison may indicate a level of similarity between the hypothetical candidate synchronization sequences and actual received synchronization sequences, and accordingly be used to evaluate the quality of a carrier channel.

Consequently, a hypothetical synchronization sequence 422-426 or 432-436 identified by $s_{PSS,r}^{k}$ that exhibits a high degree of similarity, e.g. a high cross-correlation value, between an actual received synchronization sequence may indicate that a local base station is broadcasting a strong radio signal over the $k^{th}$ EARFCN hypothesis. As previously detailed, a high value of cross-correlation between a hypothetical candidate synchronization sequence and an actual synchronization sequence received over a wireless carrier channel may indicate low levels of noise and interference over the respectively assigned carrier channel. Accordingly, if a candidate synchronization sequence $s_{PSS,r}^{k}$ produces a high level of cross-correlation with a received synchronization sequence, the carrier channel defined associated with the $k^{th}$ EARFCN hypothesis may be selected as a potentially desirable carrier channel for mobile communications.

An exemplary system may store a plurality candidate mobile radio local reference signals such as a plurality of synchronization sequences $s_{PSS,r}^{k}$. For example, an exemplary system may store a sequence grouping consisting of three baseband synchronization sequences for each of the 692 possible EARFCN hypotheses (i.e., for k=1, 2, ..., 691, 692). Such an exemplary system would include e.g. 692 sequence groupings similar to 420 and 430 shown in FIG. 4, where each sequence grouping is centered at a center frequency of one of the 692 EARFCN hypotheses on frequency axis 400. A plurality of rotated synchronization sequences may accordingly be used as a plurality of pre-stored candidate mobile radio local reference signals, e.g. as detailed regarding 220 of flow chart 200.

Upon reception of a wireless digital system, an exemplary system may determine a plurality of cross-correlation coefficients by comparing the received wireless signal with one or more of the plurality candidate mobile radio local reference signals, or synchronization sequences. For example, a processor or processing circuit may execute a cross-correlation function with correlator output $\Delta(k,r,n)$, where $\Delta(k,r,n)$ is calculated as in accordance with Equation (1):

$$\Delta(k,r,n) = \Sigma_{u=0}^{U-1} |\Sigma_{v=0}^{V-1} x(n-u \cdot V-v)^* \text{conj}(sPSSk,r(u \cdot V+v))|. \quad (1)$$

In equation (1), x is the vector representing a received digitized signal, where x(n) is the $n^{th}$ frame of the x. As previously detailed, $s_{PSS}{}^{k}{}_{,r}$ is the synchronization sequence defined by k and r. The parameter V is used to control the size of a coherent combining window and U is the number of coherent combining windows used for correlation. U may range from 1 to 4, for example. V may range from 32 to 128, for example.

The correlator output $\Delta(k,r,n)$ may be a metric to evaluate potential carrier channels, e.g. as a cross-correlation metric as calculated in 310 of flow chart 300. An exemplary aspect may seek to analyze the suitability of k potential carrier channels, e.g. for suitability in a mobile radio cell scan (330 of flow chart 300) or carrier aggregation process (see 730 of flow chart 700). Each of the k carrier channels may correspond to an EARFCN in an LTE communication network. An exemplary LTE system may provide a fixed number r possible synchronization sequences. Such a system may utilize each of the r possible synchronization sequences on each of the k carrier channels, thereby providing k·r overall possible combinations of synchronization synchronizes, i.e. each of the r sequences at each of the k possible carrier channel frequencies.

Accordingly a correlator output $\Delta(k,r,n)$ represents the correlation between a received digitized signal x(n) and one of the k·r possible candidate mobile radio local reference signals $s_{PSS}{}^{k}{}_{,r}$. Each candidate mobile radio local reference signal may be pre-stored. Each candidate mobile radio local reference signal may be a Primary Synchronization Signal rotated in frequency according to the center frequency of a carrier channel in a mobile communication network. Consequently, a high correlator output between a received digitized signal and one of the k·r possible candidate mobile radio local reference signals may indicate that the corresponding $k^{th}$ EARFCN may provide a high level of mobile communication. An exemplary system may then select one or more of the determined cross-correlator outputs to select carrier channels to attempt to utilize for wireless communication. As detailed above, such an exemplary system may select one or more cross-correlation output coefficients calculated using one of the k·r candidate mobile radio local reference signals and identify a corresponding $k^{th}$ carrier channel for use in a mobile radio cell scan. Frequency scan post-processing circuit 210 may perform this selection of cross-correlation coefficients in 320.

An exemplary aspect may reduce processing needs by pre-storing each of the candidate mobile radio local reference signals before starting cross-correlation calculations. An exemplary aspect may retrieve the required candidate mobile radio local reference signals when needed. Such an exemplary aspect may reduce processing power requirement by pre-storing candidate mobile radio local reference signals in this manner as opposed to calculating candidate mobile radio local reference signals for each required cross-correlation operation.

Exploiting certain characteristics of the candidate mobile radio local reference signals may result in further improvements. For example, 310 in method 300 may determine a first cross-correlation coefficient using one or more intermediate values. Method 300 may consequently determine a second cross-correlation coefficient using the same one or more intermediate values. Using intermediate values in multiple calculations may save processing power as less overall calculations are required.

In an exemplary aspect, at least one of the intermediate values may reflect a predefined relationship between at least two of the candidate mobile radio local reference signals. For example, the at least two candidate mobile radio local reference signals may be complex conjugates of each other. An exemplary aspect may exploit this relationship in order to re-use the same values used in calculation of one cross-correlation coefficient in the calculation of a different cross-correlation coefficient.

As previously detailed, a further exemplary aspect may provide that the candidate mobile radio local reference signals are Primary Synchronization Signal (PSSs), e.g. such as PSS vectors used in LTE communication networks.

As specified in 3GPP, the PSS vector $s_{PSS,2}$ (i.e., the baseband PSS vector defined by r=2) is the complex conjugate of the PSS vector $s_{PSS,1}$, i.e. $s_{PSS,1} = \text{conj}(s_{PSS,2})$. Therefore, an exemplary system may utilize this predefined relationship in order to reuse intermediate results. Intermediate results may be reused if the following condition defined in Equation (2) holds:

$$s_{PSS}{}^{k}{}_{,1} = \text{conj}(s_{PSS}{}^{l}{}_{,2}) \quad (2)$$

In Equation (2), k and l each identify a corresponding $k^{th}$ and $l^{th}$ EARFCN hypothesis. Similarly, 1 and 2 indicate the (r=1) and (r=2) PSS vectors.

Therefore, an exemplary aspect may provide for a selection of two EARFCN hypotheses $s_{PSS}{}^{k}{}_{,1}$ and $s_{PSS}{}^{l}{}_{,2}$, where $s_{PSS}{}^{l}{}_{,2}$ is the complex conjugate of $s_{PSS}{}^{k}{}_{,1}$, to reuse intermediate values for the determination of cross-correlation coefficients between a received digitized signal and at least one of the candidate mobile radio local reference signals.

An exemplary aspect may process the received digitized signal based on a target center frequency, and may correspondingly determine the plurality of cross-correlation coefficients based on the processed received digitized signal. For example, an exemplary aspect may select the target center frequency based on at least two characteristic signal frequencies, each associated with one of the at least two candidate mobile radio reference signals. The target center frequency may be a midpoint between the at least two characteristic signal frequencies.

In other words, an exemplary system may enable the use of intermediate values in the determination of cross-correlation coefficients by processing the received digitized signal, and utilizing the corresponding processed received digitized signal in the calculation of cross-correlation coefficients. In order to satisfy the above relationship $s_{PSS}{}^{k}{}_{,1} = \text{conj}(s_{PSS}{}^{l}{}_{,2})$, an exemplary system may need to select an appropriate center frequency to process the input received digitized signal based on a frequency characteristic of the synchronization sequences $s_{PSS}{}^{k}{}_{,1}$ and $s_{PSS}{}^{l}{}_{,2}$.

As detailed in FIG. 3, method 300 may provide for a determination of a plurality of cross-correlation coefficients for the received digitized signal in 310. For example, 310 may determine the plurality of cross-correlation coefficients by cross-correlating the received digitized signal with at least one of a plurality of candidate mobile radio local reference signals, such as at least one of a plurality of k·r PSS vectors defined by $s_{PSS}{}^{k}{}_{,r}$.

Figure 5:
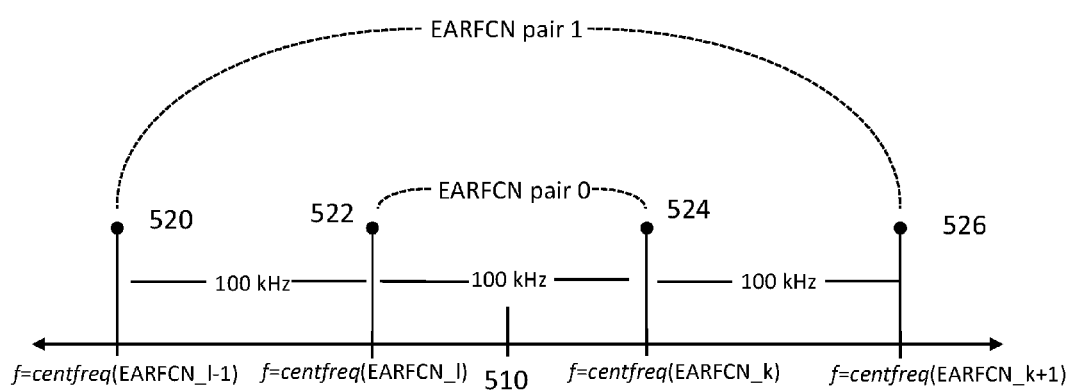
FIG. 5 shows an implementation of target center frequency selection.

FIG. 5 illustrates an exemplary aspect that may use intermediate values in the determination of the plurality of cross-correlation coefficients, e.g. in 310 of flowchart 300. FIG. 5 shows the center frequencies 520-526 of four PSS vectors $s_{PSS}{}^{l-1}{}_{,1}$, $s_{PSS}{}^{l}{}_{,2}$, $s_{PSS}{}^{k}{}_{,1}$, and $s_{PSS}{}^{k+1}{}_{,2}$ as plotted on frequency grid 500. The center frequencies 520-526 of each PSS vector may correspond to the center frequency of a particular EARFCN hypothesis. Center frequencies 520-526 may be evenly spaced, e.g. by 100 kHz as shown in FIG. 5. Such a frequency spacing corresponds with LTE carrier channels that are evenly spaced on an m*100 kHz frequency grid, which is common in conventional LTE systems. As previously detailed, 3GPP dictates that baseband PSS vectors $s_{PSS,2}$ and $s_{PSS,1}$ are complex conjugates of each another. However, PSS vectors $s_{PSS}{}^{k}{}_{,1}$ and $s_{PSS}{}^{k}{}_{,2}$ have been rotated in frequency according to the $k^{th}$ EARFCN hypothesis. Accordingly, the relationship of complex conjugacy that is present at baseband frequencies may be lost when the PSS vectors are shifted in frequency.

An exemplary aspect may re-establish the complex conjugacy between two PSS vectors $s_{PSS}{}^{k}{}_{,1}$ and $s_{PSS}{}^{l}{}_{,r}$ for purposes of utilizing intermediate values in cross-correlation calculations by selecting a suitable frequency with which to process the received digitized signal before cross-correlation calculations.

For example, an exemplary system may seek to determine cross-correlation coefficients between the received digitized signal and candidate mobile radio local reference signals $s_{PSS}{}^{k}{}_{,1}$ and $s_{PSS}{}^{l}{}_{,2}$, such as PSSs with center frequencies 522 and 524 as shown in FIG. 5. Accordingly, an exemplary aspect may select a target center frequency to process the received digitized signal with. This target center frequency may be selected by analyzing characteristics of candidate mobile radio local reference signals $s_{PSS}{}^{k}{}_{,1}$ and $s_{PSS}{}^{l}{}_{,2}$, such as corresponding center frequencies 522 and 524. An exemplary system may utilize the resulting processed received digitized signal to determine a plurality of cross-correlation coefficients (e.g., as in 310 of flow chart 300). Reusing intermediate values in multiple calculations may reduce processing power requirements. For example, an exemplary aspect may select the target center frequency to process the received digitized signal with as midpoint 510 on frequency grid 500 between center frequencies 522 and 524 of candidate mobile radio local reference signals $s_{PSS}{}^{k}{}_{,1}$ and $s_{PSS}{}^{l}{}_{,2}$. This operation may re-establish the relationship of complex conjugacy between frequency rotated candidate mobile radio local reference signals $s_{PSS}{}^{k}{}_{,1}$ and $s_{PSS}{}^{l}{}_{,2}$. Accordingly, 310 in method 300 may re-use intermediate values in the determination of a plurality of cross-correlation coefficients.

Additionally, an exemplary aspect may also utilize the same midpoint 510 in order to use intermediate values in cross-correlation calculations involving candidate mobile radio local reference signals $s_{PSS}{}^{k+1}{}_{,2}$ and $s_{PSS}{}^{l-1}{}_{,1}$ with corresponding center frequencies 520 and 526. Candidate mobile radio local reference signals may be evenly spaced on a frequency grid such as frequency grid 500, e.g. at every 100 kHz. Accordingly, midpoint 510 also represents the frequency midpoint between center frequencies 520 and 526 corresponding to $s_{PSS}{}^{k+1}{}_{,2}$ and $s_{PSS}{}^{l-1}{}_{,1}$. An exemplary aspect may therefore also use intermediate values to calculate cross-correlation coefficients between $s_{PSS}{}^{k+1}{}_{,2}$ and $s_{PSS}{}^{l-1}{}_{,1}$ and the received digitized signal, which has been processed according to midpoint 510.

As detailed in FIG. 5, midpoint 510 is located at one possible position on an m*100+50 kHz frequency grid, i.e. located at the frequency midpoint of a pair of center frequencies 522 and 524 which are part of an evenly spaced m*100 kHz frequency grid. Other center frequency locations for midpoint 510 are also possible. For example, midpoint 510 could be placed instead at a location on the m*100 kHz frequency grid, such as at center frequency 524, and therefore share a center frequency with the EARFCN channel centered at center frequency 524. Correspondingly, an exemplary aspect may use the intermediate value method to calculate cross-correlation values for the received digitized signal and candidate mobile radio local reference signals associated with neighboring EARFCN channels 526 and 522 located at $f_{k+1}$=EARFCN$_k$+100 kHz=EARFCN$_{k+1}$ and $f_l$=EARFCN$_k$-100 kHz=EARFCN$_l$. However, this approach may be sub-optimal because the synchronization sequence centered at center frequency 524, which now shares the same center frequency as midpoint 510, would not be paired with another synchronization sequence. Intermediate values could not be re-used in this case as there would be no corresponding candidate mobile radio local reference signal which satisfies the complex conjugacy requirement.

An exemplary calculation which may be used in determining cross-correlation coefficients with intermediate values will now be described.

In an exemplary aspect, two vectors with V elements may be defined as follows:

$r(n,u) = [(r(n-u\cdot V) \ldots r(n-(u+1)\cdot V+1)]$ $s(k,r,u) = [\text{conj}(s_{PSS}{}^{k}{}_{,r}(u,V)) \ldots \text{conj}(s_{PSS}{}^{k}{}_{,r}((u+1)\cdot V-1))]$. (3)

The inner accumulation in Equation (2) can then be expressed as $$\phi_{r,k,u,n} = r(n, u) \times s^T(k, r, u) \quad (4)$$

$$= \text{Re}(r(n, u)) \times \text{Re}(s^T(k, r, u)) - \text{Im}(r, n, u)) \times \text{Im}(s^T(k, r, u)) + 1i *$$

$$(\text{Re}(r(n, u)) \times \text{Im}(s^T(k, r, u)) + \text{Im}(r(n, u)) \times \text{Re}(s^T(k, r, u)))$$

$$= \phi^{RR}_{r,k,u,n} - \phi^{II}_{r,k,u,n} + 1i * (\phi^{RI}_{r,k,u,n} - \phi^{IR}_{r,k,u,n}).$$

Equation (2) may then be substituted into Equation (4) for an EARFCN hypothesis pair (k,l) as defined above. Accordingly, the calculation of $\varnothing_{r,l,u,n}$ for (r=1,2) may fully reuse the values of $\varnothing^{RR}{}_{r,k,u,n}$, $\varnothing^{II}{}_{r,k,u,n}$, $\varnothing^{RI}{}_{r,k,u,n}$, and $\varnothing^{IR}{}_{r,k,u,n}$. Specifically, the relationships exist as shown below in Equation (5):

$\varnothing_{1,k,u,n} = \varnothing^{RR}{}_{1,k,u,n} - \varnothing^{II}{}_{r,k,u,n} + 1i*(\varnothing^{RI}{}_{1,k,u,n} + \varnothing^{IR}{}_{1,k,u,n})$ $\varnothing_{2,k,u,n} = \varnothing^{RR}{}_{2,k,u,n} - \varnothing^{II}{}_{2,k,u,n} + 1i*(\varnothing^{RI}{}_{2,k,u,n} + \varnothing^{IR}{}_{2,k,u,n})$ $\varnothing_{1,k,u,n} = \varnothing^{RR}{}_{2,k,u,n} - \varnothing^{RI}{}_{2,k,u,n} + 1i*(\varnothing^{RI}{}_{2,k,u,n} + \varnothing^{RI}{}_{2,k,u,n})$ $\varnothing_{2,k,u,n} = \varnothing^{RR}{}_{1,k,u,n} - \varnothing^{RI}{}_{1,k,u,n} + 1i*(\varnothing^{IR}{}_{1,k,u,n} + \varnothing^{RI}{}_{1,k,u,n})$. (5)

As shown above in Equation (5), values of $\varnothing^{RR}{}_{r,k,u,n}$, $\varnothing^{II}{}_{r,k,u,n}$, $\varnothing^{RI}{}_{r,k,u,n}$, and $\varnothing^{IR}{}_{r,k,u,n}$ may be used in calculations of $\varnothing_{r,k,u,n}$ and $\varnothing_{l,k,u,n}$. The computation requirements for testing a certain EARFCN hypothesis may be reduced by reusing intermediate values in this manner. Certain exemplary aspects may reduce computing requirements by roughly 30% when compared to the "brute force" method, which does not reuse any intermediate values. The brute force method may require 6 computations while the exemplary method as shown above only requires 4 computations.

Exemplary aspects may implement intermediate-value based calculations in different manners. For example, certain aspects may calculate intermediate values prior to the determination of either cross-correlation coefficient and subsequently substituted into one of the above equations in order. Alternatively, an exemplary aspect may determine intermediate values during the process of determining one cross-correlation coefficient. The intermediate values may then be re-used in a later calculation of another cross-correlation coefficient.

Figure 6:
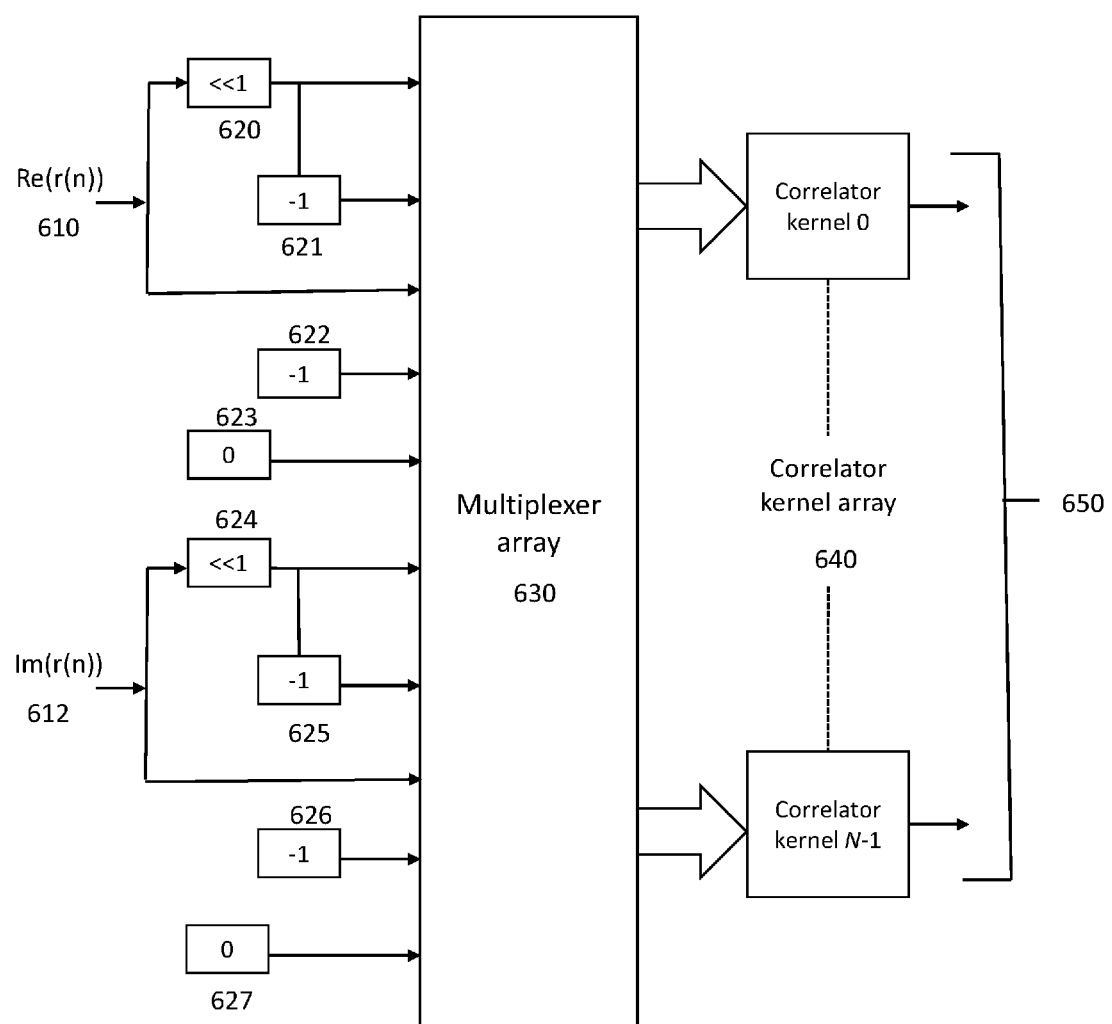
FIG. 6 shows a processor designed to support cross-correlation calculations.

FIG. 6 shows an exemplary correlator unit 600 that will be described below. The correlator unit 600 may implement the intermediate-value based cross-correlation determination.

In FIG. 6, correlator unit 600 is shown. Correlator unit 600 may include multiplexer array 630, correlator kernel array 640, and constant numeric registers 620-627. Correlator unit 600 may receive both the real component 610 of received digitized signal r(n) and the imaginary component 612 of received digitized signal r(n) as inputs. Received digitized signal r(n) may have previously been processed according to a target center frequency such as described above in reference to FIG. 5 in order to satisfy requirements related to Equation (2). Muliplexer array 630 and correlator kernel array 640 may process both the real component 610 and imaginary component 620 in order to determine a plurality of cross-correlation coefficients. Method 300 may determine a plurality of cross-correlation coefficients in 310 using a correlator unit such as correlator unit 600.

Correlator unit 600 may also reduce computation requirements. For example, correlator unit 600 may use low bit precision in correlation calculations. Correlator unit 600 may perform calculations using 2.5 bits, i.e. with possible values of (−2, −1, 0, 1, and 2). Low bit precision implementations may offer advantages in computing requirements due to the fact that all possible multiplication values required in computation may be calculated ahead of time and simply selected for use when needed. For example, constant numeric registers 620-627 may hold all possible bit values, which have been pre-calculated before cross-correlation computation is commenced. Correspondingly, one of the N correlator kernels in correlator kernel array 640 may require a value that is stored in one of constant numeric registers 620-627 in order to calculate a particular cross-correlation coefficient. Multiplexer array 630 may then select the required input from the appropriate one of constant numeric registers 620-627 and feed this value into the corresponding correlator kernel. The correlator kernel may then perform calculations using the obtained value.

Such an exemplary aspect may further reduce computing requirements. For example, multiplication calculations may place heavy demands on a processor or processing unit, thereby requiring substantial resources for repeated calculations. An exemplary system such as the one shown in FIG. 6 may calculate all possible multiplication output values ahead of time and feed them into the appropriate calculation component as they become necessary. Accordingly, processing requirements may be reduced by replacing a multiplication operation with a multiplexer selection.

Accordingly, an exemplary aspect as shown in FIG. 6 reduces the need to perform multiplication for each correlator kernel in correlator kernel array 640. In addition to reducing processing requirements, there may consequently also be a reduced hardware cost, as each correlator in correlator kernel array 640 does not require a dedicated multiplication unit. Note that many other similar arrangements to the exemplary aspect shown in FIG. 6 are possible. Additionally, the illustrated implementation using 2.5 bits could be replaced by a different bit scheme, as any number of bit schemes could potentially be implemented by a system designer based on their own needs and preferences.

In an exemplary aspect, each of the N correlator kernels in correlator kernel array 640 may determine a cross-correlation value for a given pair of EARFCN hypotheses. As previously detailed, each correlator kernel in correlator kerel array 640 may calculate the cross-correlation between a received digitized input signal and a synchronization sequence which has been shifted in frequency to match its center frequency with that of a predefined EARFCN hypothesis. Additionally, correlator unit 600 may reuse intermediate values to calculate cross-correlation coefficients for certain pairs of synchronization sequences. Each correlator kernel in correlator kernel array 640 may therefore be used to calculate values for a given pair of EARFCN hypothesis.

Additional correlator kernels may be added to correlator kernel array 640 in order to allow for the simultaneous calculation of values related for a large number of EARFCN hypothesis pairs. Stated another way, adding additional correlator kernels may allow for the parallel processing of many cross-correlation coefficients at the same time. For example, FIG. 6 currently shows correlator kernel array including of N corrrelator kernels, which produces N cross-correlation coefficients 650. However, the number of correlator kernels may be increased, such as e.g. doubled to 2N. This modified structure would accordingly produce 2N cross-correlation coefficients 650, i.e. one for each correlator kernel in correlator kernel array 640. This implementation of parallel processing may yield increased processing throughput. However, the incorporation of additional correlator kernels in correlator kernel array 640 may require additional hardware components, which in turn may increase hardware cost. However, certain exemplary implementations may require less than $10^4$ extra logic gates per additional correlator kernel. This figure may be comparatively small in certain implementations, e.g. implementations requiring $10^6$ or more logic gates for other necessary components. Consequently, a system designer may choose to include extra gates in order to reduce overall computation time, thereby providing the potential advantage of faster execution of related network protocols.

As previously detailed, a device such as UE 102 may implement a method 300 as part of a frequency scan procedure. Frequency scan circuit 208 and frequency scan post-processing circuit 210 may execute method 300. Frequency scan circuit 208 and frequency scan post-processing may be implemented as a circuit or component of UE 102 as shown in FIG. 2.

Accordingly, an exemplary aspect of the disclosure may include a mobile radio communication terminal device, such as UE 102, which may include at least one circuit configured to process received digitized signals, such as e.g. frequency scan circuit 208 and frequency scan post-processing circuit 210. UE 102 may receive wireless radio signals over antenna 202, which may then be processed by RF transceiver 204. RF transceiver 204 may receive digitize received wireless signals from antenna 202 and may supply them to memory 206. Received digitized signals may be stored in memory 206 and retrieved for future processing, such as by frequency scan circuit 208. Received digitized signals may alternatively be supplied directly to frequency scan circuit 208 for processing. Frequency scan circuit 208 may process received digitized signals by determining a plurality of cross-correlation coefficients for the received digitized signal, wherein each of the plurality of cross-correlation coefficients may be determined by cross-correlating the received digitized signal with a respective candidate mobile radio local reference signal out of a plurality of pre-stored candidate mobile radio local reference signals. As previously detailed, UE 102 may use the plurality of cross-correlation coefficients to quantify the similarity between the received digitized signal and at least one of the plurality of pre-stored candidate mobile radio local reference signals. The pre-stored candidate mobile local reference signals may be stored in a memory or other storage device such as a buffer. For example, UE 102 may store the pre-stored candidate mobile radio local reference in an internal memory. Alternatively, the candidate mobile radio local reference signals may be stored in an external location, and retrieved by UE 102 when needed. UE 102 may store the pre-stored candidate mobile radio local reference signals with received digitized signals in memory 206, or may otherwise be stored in a separate, dedicated memory on UE 102. After determining the plurality of cross-correlation coefficients, frequency scan post-processing circuit 210 may select one or more cross-correlation coefficients from the determined plurality of cross-correlation coefficients. As detailed above, frequency scan post-processing circuit may select the cross-correlation coefficients from the determined plurality of cross-correlation coefficients based on a predefined criteria. Exemplary aspects may use maximum values as a pre-defined criteria, in which case frequency scan post-processing circuit 210 may select at least one or more cross-correlation coefficients with maximum values from the determined plurality of cross-correlation coefficients.

Various other components of UE 102 may utilize information represented by the selected cross-correlation coefficients in order to perform further processes related to mobile communications. For example, mobile radio cell scan circuit 214 may perform a mobile radio cell scan based on one or more of the selected cross-correlation coefficients, to connect to a mobile radio communication network. For example, mobile radio cell scan circuit 214 may identify potential carrier channels for mobile communication based on the selected cross-correlation coefficients. UE 102 may execute future communications over a radio access network using one or more of the identified carrier channels.

A mobile radio communication device such as UE 102 may operate on a mobile radio communication network. For example, UE 102 may operate on an LTE network. UE 102 may operate on an LTE-A network.

As previously detailed, frequency scan circuit 208 in UE 102 may determine a each of a plurality of cross-correlation coefficients based on a comparison between received digitized signals and at least one of a plurality of pre-stored candidate mobile radio local reference signals. One or more of a plurality of pre-stored candidate mobile radio local reference signals may be a plurality of synchronization sequences. For example, one or more of the plurality of synchronization sequences may be a plurality of PSSs. Alternatively, one or more of the plurality of synchronization sequences may be a plurality of SSSs. Frequency scan circuit 208 may consequently calculate a cross-correlation value between a received digitized signal and a pre-stored synchronization sequence. Frequency scan post-processing circuit 210 may select one or more cross-correlation coefficients from the determined plurality of cross-correlation coefficients. Frequency scan post-processing circuit 210 may be configured to select the selected cross-correlation coefficients based on a pre-defined criteria. Frequency scan post-processing circuit 210 may select the one or more cross-correlation coefficients by identifying one or more maximum values of the determined plurality of cross-correlation coefficients. Accordingly, UE 102 may select a carrier channel for a mobile radio cell scan based on the one or more selected cross-correlation coefficients. For example, UE 102 may perform a mobile radio cell scan based on information obtained via the cross-correlation value determination and selection. One or more circuits or processing units on UE 102 may implement a mobile radio cell scan. For example, mobile radio cell scan circuit 214 may execute a mobile radio cell scan. Mobile radio cell scan circuit 214 may perform a mobile radio cell scan using one or more carrier channels that were identified using the selected cross-correlation coefficients, as discussed above.

Frequency scan post-processing circuit 210 may select the one or more carrier channels from a plurality of predefined carrier channels, i.e. the set of possible carrier channels may be defined prior to commencement of various processes. One or more of the plurality of predefined carrier channels may correspond to an EARFCN used in an LTE communication network. For example, one or more of the carrier channels may share a center frequency with a respective EARFCN. The plurality of carrier channels which may be selected may be the entire set or a subset of all possible EARFCNs. Accordingly, UE 102 may select a carrier channel for mobile communication using a set of EARFCNs.

One or more of the plurality of pre-stored candidate mobile radio local reference signals may reflect a characteristic of a carrier channel for a radio access network. For example, a frequency characteristic of one or more of the plurality of pre-stored candidate mobile radio local reference signals may correspond to a frequency associated with a predefined carrier for a radio access network. More particularly, one or more of the pre-stored candidate mobile radio local reference signals may be a predefined synchronization sequence rotated in frequency according a predefined frequency scheme.

For example, frequency scan circuit 208 may determine each of a plurality of cross-correlation coefficients by cross-correlating a received digitized signal with one or more pre-stored candidate mobile radio local reference signals. Each of these pre-stored candidate mobile radio local reference signals may correspond with a potential carrier channel in a radio access network. The potential carrier channels may be defined by a frequency scheme such as a set of EARFCNs. For example, each pre-stored candidate mobile radio local reference signal may directly correspond with one EARFCN, and accordingly one or more of the pre-stored candidate mobile radio local reference signals may differ from another of the pre-stored candidate mobile radio local reference signals according to the difference between respective EARFCNs which each pre-stored candidate mobile radio local reference signals is based on.

Additionally, at least one of the plurality of pre-stored candidate mobile radio reference signals may differ from another of the plurality of pre-stored candidate mobile radio reference signals according to a predefined frequency scheme.

In a potentially advantageous aspect, each pre-stored candidate mobile radio local reference signal may be a predefined synchronization sequence that has been frequency "shifted" or "rotated" in frequency. Each predefined synchronization sequence may be shifted in frequency according to a predefined frequency scheme, such as one based on EARFCN hypotheses as detailed above regarding FIG. 4.

Each of the pre-stored candidate mobile radio local reference signals may differ from one another according to the predefined frequency scheme. A pair of pre-stored candidate mobile radio local reference signals may differ from one another by the same frequency value as the difference between another pair of pre-stored candidate mobile radio local reference signals. The frequency value in such an exemplary aspect may be in the range from e.g. about 10 kHz to 500 kHz. The differences between pre-stored candidate mobile radio local reference signals may additionally correspond to the difference between the center frequencies of a plurality of predefined carrier channels. For example, each pre-stored candidate mobile radio local reference signal may be centered at a center frequency of a given carrier channel, such as described regarding FIG. 4.

In certain exemplary aspects, each pre-stored candidate mobile radio local reference signal may be evenly spaced on a frequency grid. For example, the center frequency of each pre-stored candidate mobile radio local reference signal may be evenly spaced from one another on a frequency axis.

Frequency scan circuit 208 may also be configured to utilize intermediate values in the determination of the plurality of cross-correlation coefficients. For example, frequency scan circuit 208 may determine a first cross-correlation coefficient using one or more intermediate values, and determine a second cross-correlation coefficient using one or more of the same intermediate values. The intermediate values may reflect a predefined relationship between at least two of the candidate mobile radio local reference signals. The at least two candidate mobile radio local reference signals may be complex conjugates of each other. Additionally, the candidate mobile radio local reference signals may be PSSs. As detailed above, certain PSSs utilized by LTE networks are defined to exhibit a complex conjugacy relationship.

An exemplary implementation of frequency scan circuit 208 that utilizes intermediate-value based cross-correlation value determination may process a received digitized signal according to a target center frequency, and accordingly may determine the plurality of cross-correlation coefficients based on the processed received digital signal. Frequency scan circuit may be configured to select the target center frequency based on at least two characteristic signal frequencies, wherein each may further be associated with one of at least two of the candidate mobile radio local reference signal. As previously detailed, the target center frequency that is selected and utilized by frequency scan circuit 208 may be selected as a midpoint between the at least two characteristic signal frequencies, as shown in FIG. 5.

Figure 7:
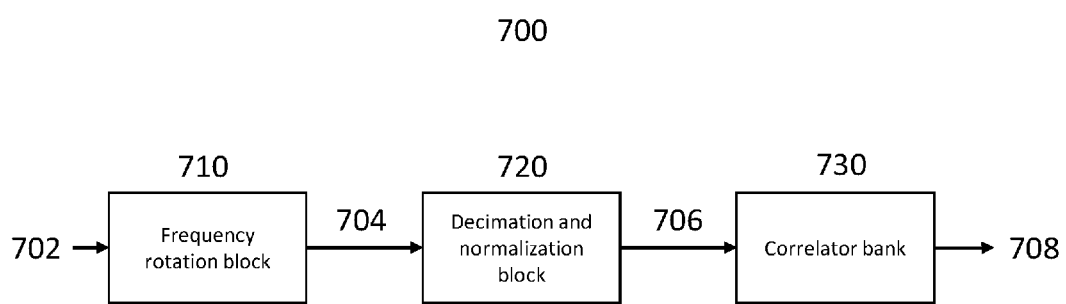
FIG. 7 shows various components and circuits of a mobile radio communication terminal device of FIG. 1.

FIG. 7 shows CCF-based frequency scan circuit 700. Frequency scan circuit 208 of UE 102 may be implemented with a similar internal structure, although the disclosure is not limiting in this respect.

CCF-based frequency scan circuit 700 as shown in FIG. 7 contains frequency rotation block 710, decimation and normalization block 720, and correlator bank 730. CCF-based frequency scan circuit 700 receives wideband data input 702. A receiver component such as e.g. RF transceiver 204 may supply wideband data input 702. Alternatively, a memory or buffer such as e.g. memory 206 may provide wideband data input 702. Wideband data input 702 may be received after being wirelessly transmitted by a base station such as e.g. one of base stations 104-108. Wideband data input 702 may contain a synchronization sequence intended for use by a UE such as e.g. UE 102 to organize mobile communications. For example, wideband data input 702 may contain one or more PSS vectors that were broadcast over a particular carrier channel at a dedicated carrier frequency. Wideband data input 702 may contain at least one synchronization sequence $s_{PSS,r}^k$ as detailed regarding FIG. 4. Accordingly, a contained synchronization sequence may be a synchronization sequence $s_{PSS,r}^k$ centered at $f_k$=centfreq (EARFCN$_k$). Additionally, a synchronization sequence $s_{PSS,r}^k$ contained in wideband data input 702 may have been partially corrupted by noise and interference during wireless transmission. CCF-based frequency scan circuit 700 may process wideband data input 702 in order to extract a contained synchronization sequence and compare it to a pre-stored candidate mobile radio local reference signal.

Accordingly, wideband data input 702 may be provided to frequency rotation block 710. As shown in FIG. 7, frequency rotation block 710 may be coupled to decimation and normalization block 720. Frequency rotation block 710 and decimation and normalization block 720 may process wideband data input 702 in order to extract any existing synchronization sequences. For example, frequency rotation block 710 may rotate wideband data input 702 according to a target frequency. Rotated data signal 704 may be then provided to decimation and normalization block 720. Decimation and normalization block 720 may be configured to perform an extraction process on the rotated signal in order to retrieve a synchronization sequence contained in wideband data input 702. For example, decimation and normalization block 720 may decimate rotated data signal 704. Decimation and normalization block 720 may also normalize rotated data signal 704 in order to obtain a synchronization sequence that was present in wideband data input 702 at the target frequency. Decimation and normalization block 720 may then provide extracted synchronization sequence 706 to correlator bank 730.

Extracted synchronization sequence 706 may vary dramatically based on a received input signal. For example, wideband data input 702 may not have received any meaningful data at the target frequency, i.e. there was no relevant transmitter broadcasting with the target frequency as its carrier channel. Accordingly, extracted synchronization sequence 706 may be substantially noise. Alternatively, a transmitter such as e.g. a base station may have been broadcasting a strong, substantially noise-free signal containing a synchronization sequence over the target frequency. In this exemplary case, extracted synchronization sequence 706 may by a synchronization sequence $s_{PSS,r}^k$ containing very few artifacts due to noise and interference. The amount of noise and interference contained in $s_{PSS,r}^k$ may depend on the quality of the carrier channel at the target frequency, and consequently the amount of noise and interference in $s_{PSS,r}^k$ may quantify the channel quality of the carrier channel.

As shown in FIG. 7, extracted synchronization sequence 706 may be provided to correlator bank 730. Correlator bank 730 may then compare extracted synchronization sequence 706 to one or more of a plurality of candidate mobile radio local reference signals. As previously detailed, one or more of the plurality of candidate mobile radio reference signals may be pre-stored, i.e. may be calculated and stored in a memory or buffer. One or more of the plurality of candidate mobile radio local reference signals may be a synchronization sequence, such as e.g. a PSS. Accordingly, correlator bank 730 may compare extracted synchronization sequence 706 with one or more of the synchronization sequences to obtain one or more cross-correlation coefficients. As previously detailed, these cross-correlation coefficients may reflect the similarity between extracted synchronization sequence 706 and a corresponding pre-stored synchronization sequence. An exemplary aspect of the disclosure may utilize the calculated cross-correlation coefficients to evaluate the quality of potential carrier channels. Additionally, correlator bank 730 may be implemented using a correlator unit similar to correlator 600.

Correlator bank 730 may be configured to output the calculated cross-correlation coefficients 708. The calculated cross-correlation coefficients 708 may be subsequently analyzed by another component. Alternatively, correlator bank 730 may perform an internal analysis and output the results of the analysis.

As previously detailed, frequency scan circuit 208 may be implemented as CCF-based frequency scan circuit 700. Accordingly, CCF-based frequency scan circuit 700 may provide the calculated cross-correlation coefficients 708 to frequency scan post-processing circuit 210 of UE 102. Frequency scan post-processing circuit 210 may then select cross-correlation coefficients based on the cross-correlation coefficients 708 provided by correlator bank 730.

Figure 8:
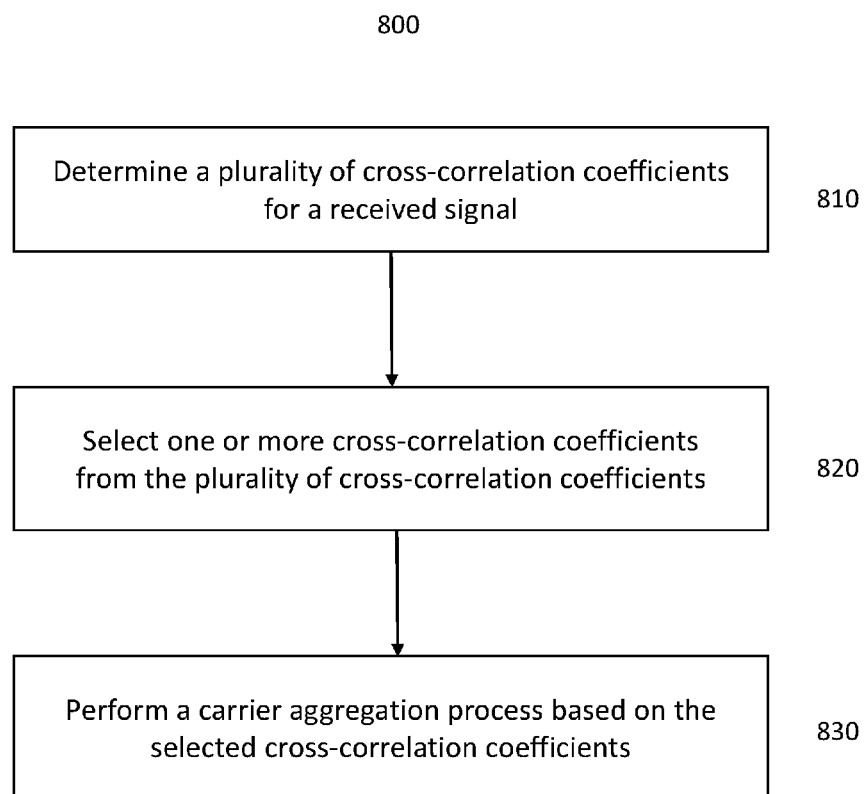
FIG. 8 shows a flow diagram illustrating a method of processing received signals.

FIG. 8 shows a flow chart 800 that details a method for processing received digitized signals. In contrast to the method shown in flow diagram 300, the method of flow chart 800 details using cross-correlation coefficients between a received digitized signal and a plurality of pre-stored candidate mobile radio local reference signals to support a carrier aggregation process. In an exemplary aspect, method 800 may be implemented as a frequency scan process as performed by frequency scan circuit 208 and frequency scan post-processing circuit 210.

Similarly to method 300, method 800 may include determining a plurality of cross correlation coefficients for the received digitized signal 810. Method 800 may be configured to determine each of the plurality of cross correlation coefficients by cross-correlating the received digitized signal with a respective candidate mobile radio local reference signal out of a plurality of pre-stored candidate mobile radio local reference signals.

820 may include selecting one or more cross-correlation coefficients from the determined plurality of cross-correlation coefficients. Method 800 may select one or more cross-correlation coefficients in 820 based on a predefined criteria, such as e.g. maximum values.

In contrast to flow chart 300, which included performing a mobile radio cell scan, method 800 may include performing a carrier aggregation process based on one or more of the selected cross-correlation coefficients 830. For example, as opposed to utilizing the selected cross-correlation coefficients to identify potential carrier channels for performing a cell scan, 830 may instead utilize the selected cross-correlation coefficients to identify carrier channels for potential use in carrier aggregation. LTE-A networks may use carrier aggregation procedures to employ multiple carrier channels for a single UE, thereby dramatically increasing bandwidth. Method 800 may therefore use the selected cross-correlation coefficients of 810 and 820 to identify candidate carrier channels for use in carrier aggregation.

Accordingly, method 800 may be implemented as part of an LTE system, such as an LTE-A system that may perform carrier aggregation.

One or more of the plurality of pre-stored candidate mobile radio local reference signals used in 810 may be a plurality of synchronization sequences. A further exemplary aspect may include where one or more of the plurality of synchronization sequences are a plurality of PSSs.

Similarly to method 300, 820 may select cross-correlation coefficients by identifying one or more maximum values of the determined plurality of cross-correlation coefficients. Method 800 may select one or more of the cross-correlation coefficients that have the largest absolute value, i.e. the cross-correlation coefficients that represent the highest degree of correlation.

830 may include performing a carrier aggregation process based on one or more of the selected cross-correlation coefficients. Specifically, 830 may select a carrier channel for the carrier aggregation process based on the one or more selected cross-correlation coefficients. 830 may select the carrier channel from a plurality of predefined carrier channels. Similarly to the carrier channel identification for a mobile radio cell scan in an exemplary aspect of flow chart 300, one or more of the plurality of predefined carrier channels may correspond to an EARFCN.

One or more of the plurality of pre-stored candidate mobile radio local reference signals used in 810 may reflect a characteristic of a carrier channel for a radio access network. Specifically, a frequency characteristic of one or more of the plurality of pre-stored candidate mobile radio local reference signals may correspond to a frequency associated with a predefined carrier channel for a radio access network. At least one of the plurality of pre-stored candidate mobile radio local reference signals may differ from another of the plurality of pre-stored candidate mobile radio local reference signals according to a predefined frequency scheme. One or more of the pre-stored candidate mobile radio local reference signals may be a predefined synchronization sequence rotated in frequency according to a predefined frequency scheme. As detailed regarding FIG. 4, one or more of the pre-stored candidate mobile radio local reference signals may be a synchronization sequence such as a PSS which has been shifted in frequency according to the center frequency of an EARFCN. Accordingly, method 800 may compare each of these pre-stored candidate mobile radio local reference signals with the received digitized signal in order to evaluate carrier channels that are broadcasting a strong wireless signal. A pre-stored candidate mobile radio local reference signal that yields a high cross-correlation value may indicate a strong cell broadcast on the carrier frequency associated with the pre-stored candidate mobile radio local reference signal, while a pre-stored candidate mobile radio local reference signal that produces a low cross-correlation value may indicate a weak or non-existent communication channel at the associated carrier frequency.

At least some of the plurality of pre-stored candidate mobile radio local reference signals may be evenly spaced from one another on the frequency axis. For example, a pair of pre-stored candidate mobile radio local reference signals may be separated from each other by the same distance on the frequency axis (i.e. separated by the same frequency value) as another pair of pre-stored candidate mobile radio local reference signals. The separation distance on the frequency axis may be in the range from e.g. about 10 kHz to about 500 kHz.

As previously disclosed, at least one of the differences between candidate mobile radio local reference signals used in 810 may correspond to a difference between the center frequencies of a plurality of predefined carrier channels. For example, each pre-stored candidate mobile radio local reference signals may be located on the frequency axis according to a corresponding predefined EARFCN center frequency. The distance between pre-stored candidate mobile radio local reference signals on the frequency axis would then be defined by the center frequency of the EARFCN related to each pre-stored candidate mobile radio local reference signal.

Method 800 may also use intermediate values in 810. For example, 810 may determine a first cross-correlation using one or more intermediate values. 810 may then determine a second cross-correlation correlation using the same one or more intermediate values. As previously detailed, utilizing intermediate values in the determination of cross-correlation coefficients may reduce the number of required processing operations.

At least one of the intermediate values may reflect a predefined relationship between two of the candidate mobile radio local reference signals. For example, 810 may use intermediate values due to the fact that two candidate mobile radio local reference signals are complex conjugates of each other. The two candidate mobile radio local reference signals may be PSSs. As detailed above, PSSs identified by (r=1) and (r=2) may be complex conjugates of one another in conventional LTE systems.

An exemplary implementation of flow chart 800 that utilizes intermediate values in the determination of cross-correlation coefficients may include processing the received digitized signal based on a target center frequency. Method 800 may determine the plurality of cross-correlation coefficients in 810 using the resulting processed received digitized signal. For example, method 800 may select the target center frequency for processing the received digitized signal based on at least two characteristic signal frequencies. Each characteristic signal frequency may be associated with one of the at least two candidate mobile radio local reference signals which exhibit a predefined relationship. In other words, method 800 may select the target center frequency for processing the received digitized signal by using frequencies that are associated with the pair of complex conjugate candidate mobile radio local reference signals. Specifically, an exemplary implementation of flow chart 800 may process the received digitized signal according to the midpoint between each of the pre-stored candidate mobile radio local reference signals on the frequency axis.

Figure 9:
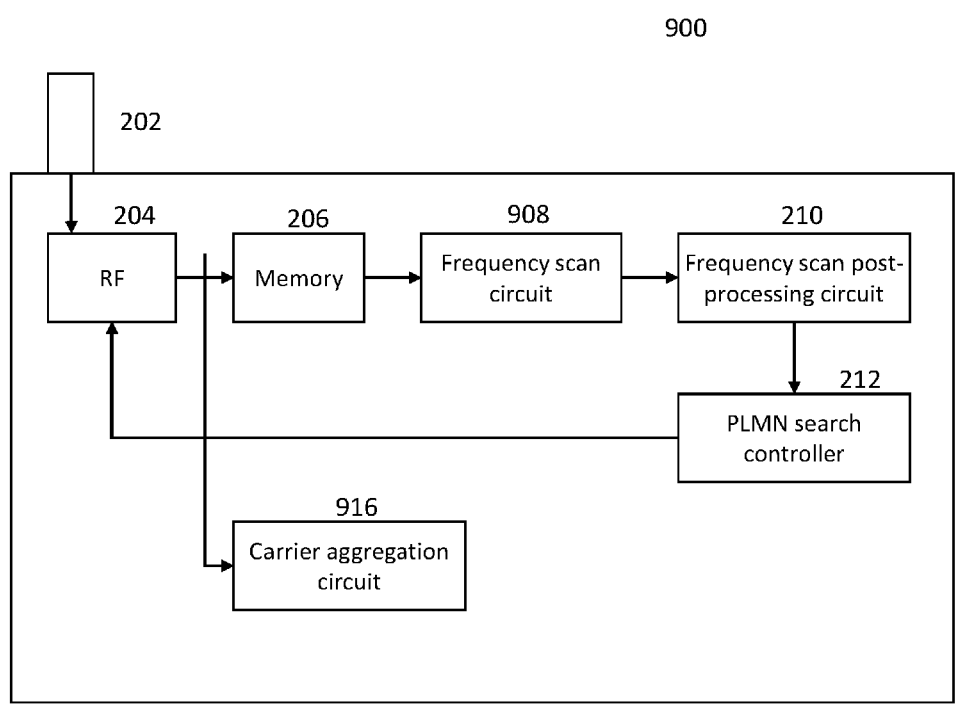
FIG. 9 shows various components and circuits of a mobile radio communication terminal device of FIG. 1.

FIG. 9 illustrates an exemplary system that utilizes the calculation of cross-correlation coefficients to support a carrier aggregation process. The various components and circuits of FIG. 9 may be implemented in a mobile station such as UE 900. Many of the components shown in FIG. 9, such as antenna 202, RF transceiver 204, memory 206, frequency scan circuit 208, frequency scan post-processing circuit 210, and PLMN search controller 212 may operate in substantially the same manner as detailed regarding UE 102 shown in FIG. 2. As detailed regarding FIG. 2, the circuits may be implemented as separate circuits, e.g. as separate integrated circuits. However, some or all of the circuits (e.g. the frequency scan circuit 208, the frequency scan post-processing circuit 210, the PLMN search controller 212, and/or the carrier aggregation circuit 916) may be implemented by a single common programmable processor, such as e.g. a microprocessor.

FIG. 9 shows a mobile radio communication terminal device, i.e. e.g. UE 900, including at least one circuit configured to perform a method of processing received digitized signals. Antenna 202, RF transceiver 204, and memory 206 may perform operations such as receiving and storing a wireless radio signal, as well as storing it in a local memory. Frequency scan circuit 208 may be configured to determine a plurality of cross-correlation coefficients for a received digitized signal. Frequency scan circuit 208 may determine each of the plurality of cross-correlation coefficients by cross-correlating the received digitized signal with a respective candidate mobile radio local reference signal out of a plurality of pre-stored candidate mobile radio local reference signals.

Frequency scan post-processing circuit 210 may also be configured to select one or more cross-correlation coefficients from the determined plurality of cross-correlation coefficients.

In contrast to UE 102 as shown in FIG. 2, UE 900 as shown in FIG. 9 may include carrier aggregation circuit 916. Carrier aggregation circuit 916 may be configured to perform a carrier aggregation process based on one or more of the selected cross-correlation coefficients to connect to a mobile radio communication network.

UE 900 may be configured to operate on a mobile radio communication network such as an LTE network. UE 900 may also be configured to operate on an LTE-A network One or more of the plurality of pre-stored candidate mobile radio local reference signals used by frequency scan circuit 208 may be a plurality of synchronization sequences. Similarly to as described above, one or more of the plurality of synchronization sequences may be a plurality of PSSs, such as those used in LTE communication networks.

Frequency scan post-processing circuit 210 may select cross-correlation coefficients from the plurality of cross-correlation coefficients by identifying one or more maximum values of the determined plurality of cross-correlation coefficients. Accordingly, a further exemplary implementation of frequency scan post-processing circuit 210 may be configured to select one or more carrier channels for a carrier aggregation process based on the selected cross-correlation coefficients. For example, frequency scan post-processing circuit 210 may select a carrier channel that was associated with a pre-stored candidate mobile radio local reference signal that produced a high cross-correlation metric with a received digitized signal.

Frequency scan post-processing circuit 210 may select a carrier channel to be used for a carrier aggregation process from a plurality of predefined carrier channels. Additionally, one or more of the plurality of predefined carrier channels may correspond to an EARFCN.

One or more of the pre-stored candidate mobile radio local reference signals used by frequency scan circuit 208 for determination of cross-correlation coefficients may reflect a characteristic of a carrier channel for a radio access network. For example, a frequency characteristic of one or more of the plurality of pre-stored candidate mobile radio local reference signals may correspond to a frequency associated with a predefined carrier channel for a radio access network. At least one of the plurality of pre-stored candidate mobile radio local reference signals may differ from another of the plurality of pre-stored candidate mobile radio local reference signals according to a predefined frequency scheme. In a further exemplary aspect, one or more of the pre-stored candidate mobile radio local reference signals may be a predefined synchronization sequence, such as e.g. a baseband PSS, rotated in frequency according to the predefined frequency scheme. As previously detailed, each pre-stored candidate mobile radio local reference signal may be a baseband PSS (i.e., defined by r=0, 1, or 2) which has been shifted on in the frequency domain according to the center frequency of an EARFCN.

Additionally, a pair of the pre-stored candidate mobile radio local reference signals may differ from each other by the same frequency value as another pair of pre-stored candidate mobile radio local reference signals differs from each other. For example, a pair of pre-stored candidate mobile radio local reference signals may be separated by a distance of $f_s$ on the frequency axis. Another pair of pre-stored candidate mobile radio local reference signals may also be separated by a distance of $f$ on the frequency axis. The parameter $f_s$ may be included in a wide range of frequencies, e.g. from about 10 kHz to about 500 kHz.

As previously disclosed, at least one of the differences between candidate mobile radio local reference signals may correspond to a difference between the center frequencies of a plurality of predefined carrier channels. An exemplary aspect is shown in FIG. 4, where pre-stored candidate mobile radio local reference signals are each centered on the frequency axis according to an EARFCN center frequency.

UE 900 may also be configured to use intermediate values in the determination of cross-correlation coefficients. For example, frequency scan circuit 208 may determine a first cross-correlation coefficient using one or more intermediate values. Frequency scan circuit 208 may also determine a second cross-correlation coefficient using the same one or more intermediate values.

In such an exemplary aspect, at least one of the intermediate values may reflect a predefined relationship between at least two of the candidate mobile radio local reference signals. For example, the at least two candidate mobile radio local reference signals may be complex conjugates of each other. This relationship may exist when the candidate mobile radio local reference signals are PSSs defined by (r=1) and (r=2) as used by certain LTE systems.

Frequency scan circuit 208 may process the received digitized signal based on a target center frequency, and accordingly may determine the plurality of cross-correlation coefficients based on the processed received digitized signal. Frequency scan circuit may select the target center frequency based on at least two characteristic signal frequencies, wherein each of the at least two characteristic signal frequencies is associated with the candidate mobile radio local reference signals that exhibit a predefined relationship. For example, the two candidate mobile radio local reference signals may be complex conjugates of each other. Frequency scan circuit 208 may process the received digitized signal by a target center frequency that is the midpoint between frequencies associated with the at least two complex conjugate candidate mobile radio local reference signals. For example, frequency scan circuit 208 may select the target center frequency according to the process described regarding FIG. 5.

Figure 10:
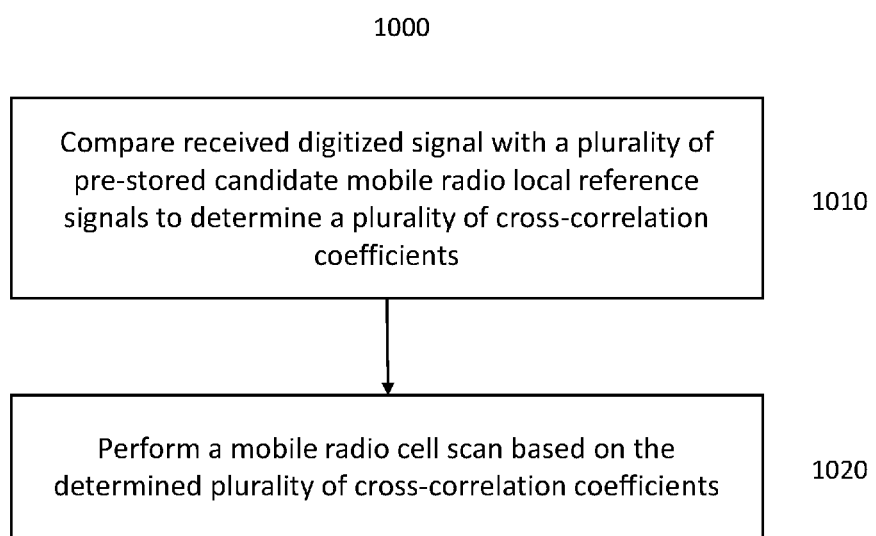
FIG. 10 shows a flow diagram illustrating a method of processing received signals.

FIG. 10 shows a flow chart 1000 that details a method for processing received digitized signals. 1010 may include comparing the received digitized signal with at least one of a plurality of pre-stored candidate mobile radio local reference signals to determine a plurality of cross-correlation coefficients. 1020 may include performing a mobile radio cell scan for a mobile radio communication network based on the determined plurality of cross-correlation coefficients.

Method 1000 may be implemented on a device which uses a mobile radio communication network such as an LTE or LTE-A network. Additionally, the predefined frequency scheme that is related to the pre-stored candidate mobile radio local reference signals may be based on a plurality of carrier channels for a radio access network, such as an LTE or LTE-A network.

One or more of the plurality of pre-stored candidate mobile radio local reference signals used in 1010 may be a plurality of synchronization sequences. One or more of the plurality of synchronization sequences may be a plurality of PSSs, such as those used in LTE networks.

Additionally, the mobile radio cell scan in 1020 may be based on the determination of one or more maximum cross-correlation coefficients of the determined plurality of cross-correlation coefficients. For example, the mobile radio cell scan in 1020 may utilize one more of the determined plurality of cross-correlation coefficients that have maximum values. Method 1000 may select a carrier channel for a mobile radio cell scan based on the one or more maximum cross-correlation coefficients. Method 1000 may select the carrier channel from a plurality of pre-stored carrier channels based on one or more characteristic signal frequencies associated with the maximum cross-correlation coefficients. For example, method 1000 may select a carrier channel that corresponds to a candidate mobile radio local reference signal that is associated with one of the maximum cross-correlation coefficients. One or more of the plurality of predefined carrier channels that may be selected for a mobile radio cell scan may correspond to an EARFCN.

One or more of the plurality of pre-stored candidate mobile radio local reference signals used in 1010 for determining the plurality of cross-correlation coefficients may reflect a characteristic of a carrier channel for a radio access network. More specifically, a frequency characteristic of one or more of the plurality of pre-stored candidate mobile radio local reference signals may correspond to a frequency associated with a predefined carrier channel for a radio access network. Similar to the method of FIG. 3, at least one of the plurality of pre-stored candidate mobile radio local reference signals may differ from another of the plurality of pre-stored candidate mobile radio local reference signals according to a predefined frequency scheme. As disclosed regarding FIG. 4, one or more of the plurality of pre-stored candidate mobile radio local reference signals may be a predefined synchronization sequence rotated in frequency according to the predefined frequency scheme, i.e. may be a baseband synchronization sequence that has been shifted in frequency according to the center frequency of a candidate carrier channel.

A pair of pre-stored candidate mobile radio local reference signals may be separated in frequency along the frequency axis by the same distance in frequency as another pair of pre-stored candidate mobile radio local reference signals. For example, a pair of pre-stored candidate mobile radio local reference signals may be separated by a distance in frequency $f_s$. A second pair of pre-stored candidate mobile radio local reference signals may also be separated in frequency by a distance of $f_s$. In certain exemplary aspects, $f_s$ may be in the range from e.g. about 10 kHz to about 500 kHz.

As previously detailed, at least one of the differences between pre-stored candidate mobile radio local reference signals used in 1010 may correspond to a difference between the center frequencies of a plurality of predefined carrier channels. For example, the location of the pre-stored candidate mobile radio local reference signals on the frequency axis may correspond to the center frequencies of a plurality of predefined carrier channels, and accordingly any difference in frequency along the frequency axis may also correspond to the center frequencies of the predefined carrier channels.

Method 1000 may use intermediate values in a similar manner to method 300. For example, 1010 may be configured to determine cross-correlation coefficients using intermediate values. 1010 may determine a first cross-correlation coefficient using one or more intermediate values, and may also determine a second cross-correlation coefficient in 1010 using the same one or more intermediate values.

At least one of the intermediate values used in an exemplary aspect of 1010 may reflect a predefined relationship between at least two of the pre-stored candidate mobile radio local reference signals. For example, the at least two pre-stored candidate mobile radio local reference signals may be complex conjugates of each other. In a further exemplary aspect, the at least two pre-stored candidate mobile radio local reference signals may be PSSs.

An exemplary aspect of 1010 using intermediate values may also include processing the received digitized signal based on a target center frequency. 1010 may then determine the plurality of cross-correlation coefficients based on the processed received digitized signal. Additionally, 1010 may select the target center frequency based on at least two characteristic signal frequencies, where each is associated with one of the at least two pre-stored candidate mobile radio local reference signals that exhibited the predefined relationship. 1010 may select the target center frequency as a midpoint between the at least two characteristic signal frequencies, similarly to as shown in FIG. 5. 1010 may select the target center frequency as a midpoint between the center frequencies of the carrier channels that each of the at least two pre-stored candidate mobile radio local reference signals is associated with.

Figure 11:
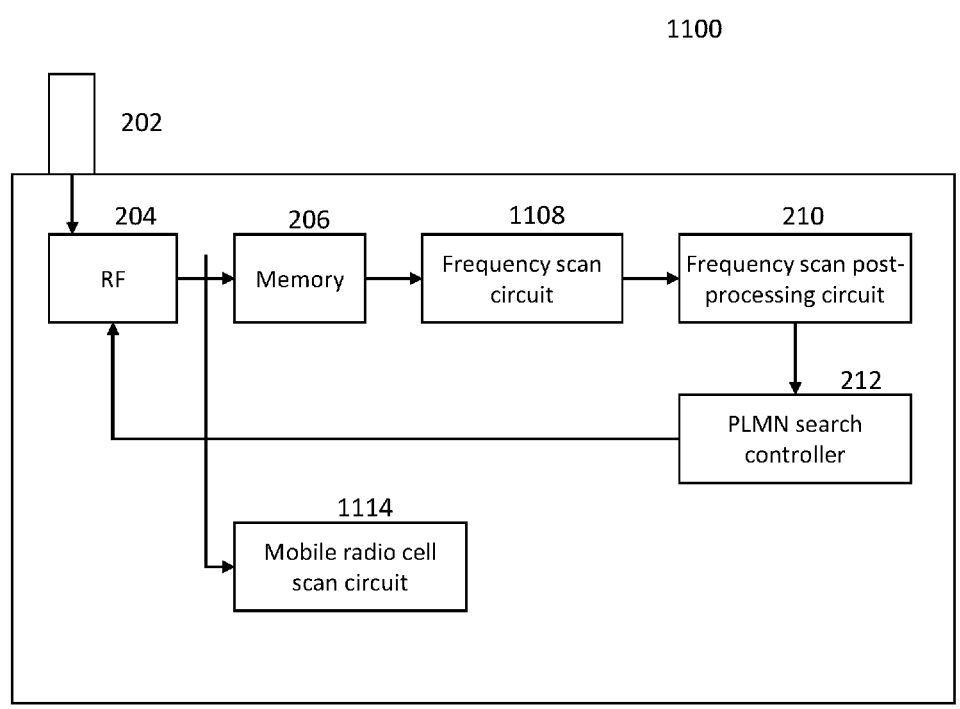
FIG. 11 shows various components and circuits of a mobile radio communication terminal device of FIG. 1.

FIG. 11 illustrates another possible configuration of a UE, which may implement a method similar to that illustrated in FIG. 10. FIG. 11 shows UE 1100, which may contain many of the same components and circuits as UE 102 and UE 900. For example, components and circuits including antenna 202, RF transceiver 204, memory 206, and frequency scan post-post processing circuit 210 may function in substantially the same manner in UE 102, UE 900, and UE 1100. Additionally, mobile radio cell scan circuit 214 may perform many of the same features in both UE 102 and UE 1100. However, the disclosure is not limited in any of these respects, and circuits and components of any of UE 102, UE 900, or UE 1100 may be rearranged or organized in a variety of configurations.

FIG. 11 shows a mobile radio communication device, i.e. UE 1100, including antenna 202, RF transceiver 204, memory 206, frequency scan circuit 1108, frequency scan post-post processing circuit 210, and mobile radio cell scan circuit 1114. Frequency scan circuit 1108 may be configured to compare a received digitized signal with at least one of a plurality of pre-stored candidate mobile radio local reference signals to determine a plurality of cross-correlation coefficients. Mobile radio cell scan circuit 1114 may be configured to perform a mobile radio cell scan for a mobile radio communication network based on the determined plurality of cross-correlation coefficients. Mobile radio cell scan circuit 1114 may operate in a substantially similar manner as to mobile radio cell scan circuit 214 provided in UE 102.

UE 1100 may communicate on an LTE or LTE-A network.

One or more of the plurality of pre-stored candidate mobile radio local reference signals used by frequency scan circuit 1108 may be a plurality of synchronization sequences. For example, one or more of the plurality of pre-stored candidate mobile radio local reference signals may be a plurality of PSSs.

Frequency scan post-processing circuit 210 may be configured to determine one or more maximum cross-correlation coefficients of the plurality of determined cross-correlation coefficients. Mobile radio cell scan circuit 1114 may accordingly perform a mobile radio cell scan based on the maximum cross-correlation coefficients identified by frequency scan post-processing circuit 210. For example, mobile radio cell scan circuit 1114 may identify one or more potential carrier channels for the mobile radio cell scan based on the maximum cross-correlation coefficients. Mobile radio cell scan circuit 1114 may select potential carrier channels from a plurality of predefined carrier channels. One or more of the plurality of predefined carrier channels may correspond to an EARFCN.

As previously described above, one or more of the plurality of pre-stored candidate mobile radio local reference signals may reflect a characteristic of a carrier channel of a radio access network. An exemplary aspect may include where one or more of the plurality of pre-stored candidate mobile radio local reference signals reflects a frequency characteristic of an EARFCN, such as a center frequency. Accordingly, a frequency characteristic of one or more of the plurality of pre-stored candidate mobile radio local reference signals may correspond to a frequency associated with a predefined carrier channel for a radio access network.

At least one of the pre-stored candidate mobile radio local reference signals may differ from another of the plurality of pre-stored candidate mobile radio local reference signals according to a predefined frequency scheme. Similarly to as detailed in regard to FIG. 4, one or more of the plurality of pre-stored candidate mobile radio local reference signals may be a predefined synchronization sequence rotated in frequency according to the predefined frequency scheme. As in FIG. 4, one or more of the plurality of pre-stored candidate mobile radio local reference signals may be a baseband synchronization sequence such as a PSS vector that has been shifted in frequency along the frequency axis to correspond with the center frequency of carrier channel such as an EARFCN. Depending on the spacing of the EARFCN center frequencies, a pair of the plurality of pre-stored candidate mobile radio local reference signals may be separated on the frequency axis by the same distance in frequency as another pair of the plurality of pre-stored candidate mobile radio local reference signals. For example, multiple pairs of pre-stored candidate mobile radio local reference signals may be separated by the same distance in frequency $f_s$. The parameter $f_s$ may range from e.g. about 10 kHz to about 500 kHz. Consequently, at least one of the difference between pre-stored candidate mobile radio local reference signals may correspond to a difference between center frequencies of a plurality of predefined carrier channels.

Frequency scan circuit 1108 may be configured to use intermediate values in determining the plurality of cross-correlation coefficients. For example, frequency scan circuit 1108 may determine a first cross-correlation coefficient using one or more intermediate values. Frequency scan circuit 1108 may also determine a second cross-correlation coefficient using the same one or more intermediate values. Such a process is described above regarding Equation (5).

The intermediate values may reflect a predefined relationship between at least two of the pre-stored candidate mobile radio local reference signals. At least two of the pre-stored candidate mobile radio local reference signals may be complex conjugates of each other. For example, the at least two pre-stored candidate mobile radio local reference signals may be PSS vectors, such as PSS vectors defined by (r=1) and (r=2) in an LTE system.

Frequency scan circuit 1108 may process the received digitized signal according to a target center frequency and accordingly may determine the plurality of cross-correlation coefficients based on the processed received digitized signal. Frequency scan circuit 1108 may select the target center frequency based on at least two characteristic signal frequencies, where each is associated with one of the at least two pre-stored candidate mobile radio local reference signals. For example, frequency scan circuit 1108 may select the center frequency as the midpoint between the at least two pre-stored candidate mobile radio local reference signals on the frequency axis.

Figure 12:
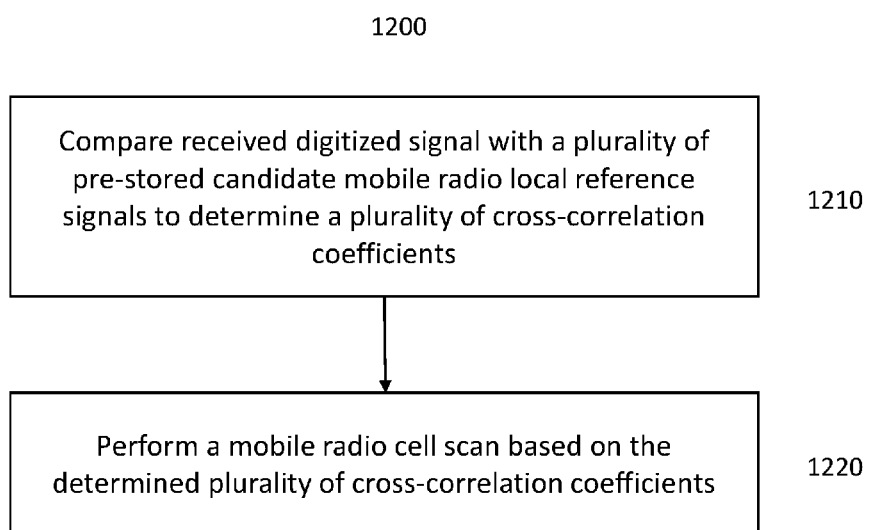
FIG. 12 shows a flow diagram illustrating a method of processing received signals

FIG. 12 shows a flow chart 1200 that illustrates a method of processing received digitized signals. Similarly to 1010 of flow chart 1000, 1210 may include comparing the received digitized signal with a plurality of pre-stored candidate mobile radio local reference signals to determine a plurality of cross-correlation coefficients. 1220 may include performing a carrier aggregation process based on the determined plurality of cross-correlation coefficients.

1220 may perform the carrier aggregation process for a mobile radio communication network, such as an LTE or LTE-A network.

The predefined frequency scheme that corresponds to the pre-stored candidate mobile radio local reference signals of 1210 may be based on a plurality of carrier channels for a radio access network. Similarly to as detailed above, the predefined frequency scheme may be based on the center frequencies of potential EARFCN hypotheses. For example, one or more of the candidate mobile radio local reference signals may be centered on the frequency axis at a center frequency of a corresponding EARFCN hypothesis.

One or more of the plurality of pre-stored candidate mobile radio local reference signals in 1210 may be a plurality of synchronization sequences. One or more of the plurality of synchronization sequences may be a plurality of PSSs.

As previously detailed, in 1220 method 1200 may include performing a carrier aggregation process based on the determined plurality of cross-correlation coefficients. For example, 1220 may perform the carrier aggregation process based on one or more maximum cross-correlation coefficients of the plurality of cross-correlation coefficients. 1220 may also include selecting a carrier channel for the carrier aggregation process based on the one or more maximum cross-correlation coefficients. For example, 1220 may select a carrier channel from a plurality of predefined carrier channels, such as from a set of possible EARFCNs. Method 1200 may select a carrier channel for carrier aggregation process in 1220 based on one or more characteristic signal frequencies associated with the one or more maximum cross correlation coefficients. For example, one or more of the plurality of pre-stored candidate mobile radio local reference signals may share a center frequency with a carrier channel out of a plurality of predefined carrier channels. 1220 may select a carrier channel for the carrier aggregation process that has a center frequency matching that of a pre-stored candidate mobile radio local reference signal that produced a maximum cross-correlation value when compared with the received digitized signal. As previously detailed, carrier channels corresponding to pre-stored candidate mobile radio local reference signals that yielded high degrees of correlation with the received digitized signal may be suitable candidates for mobile communication.

One or more of the plurality of pre-stored candidate mobile radio local reference signals used in the determination of cross-correlation values in 1210 may reflect a characteristic of a carrier channel for a radio access network. Additionally, one or more of the plurality of pre-stored candidate mobile radio local reference signals may have a frequency characteristic that corresponds to a frequency associated with a predefined carrier channel for a radio access network. As described above in relation to other exemplary aspects, at least one of the plurality of pre-stored candidate mobile radio local reference signals used in 1210 may differ from another of the candidate mobile radio local reference signals according to a predefined frequency scheme. One or more of the pre-stored candidate mobile radio local reference signals may be a predefined synchronization sequence rotated in frequency according to a predefined frequency scheme, as detailed regarding FIG. 4.

The plurality of pre-stored candidate mobile radio local reference signals in 1210 may exhibit a degree of similarity when plotted in the frequency domain. For example, a pair of pre-stored candidate mobile radio local reference signals may be separated on the frequency axis by the same distance in frequency as a different pair of pre-stored candidate mobile radio local reference signals. In other words, two pairs of pre-stored candidate mobile radio local reference signals may be contain pre-stored candidate mobile radio local reference signals which are separated by the same distance in frequency $f_s$. In certain exemplary aspects, $f_s$ may be in the range from e.g. about 10 kHz to 500 kHz. Accordingly, at least one of the difference between pre-stored candidate mobile radio local reference signals may correspond to a difference between center frequencies of a plurality of predefined carrier channels.

The method illustrated in flow chart 1200 may also utilize intermediate values in order to reduce processing requirements. For example, 1200 may determine a first cross-correlation coefficient in 1210 may utilize the same one or more intermediate values that are also used to determine a second cross-correlation coefficient. At least one of the intermediate values used in this exemplary aspect of 1210 may reflect a predefined relationship between at least two of the candidate mobile radio local reference signals. The at least two candidate mobile radio local reference signals may be complex conjugates of each other, such as PSS vectors defined by (r=1) and (r=2).

In 1210, method 1200 may process the received digitized signal based on a target center frequency. Consequently, 1210 may determine the plurality of cross-correlation coefficients based on the processed received digitized signal. 1210 may select the target center frequency based on at least two characteristic signal frequencies, each associated with one of the at least two candidate mobile radio local reference signals. In a further exemplary aspect, the target center frequency may be a midpoint between the at least two characteristic signal frequencies.

Figure 13:
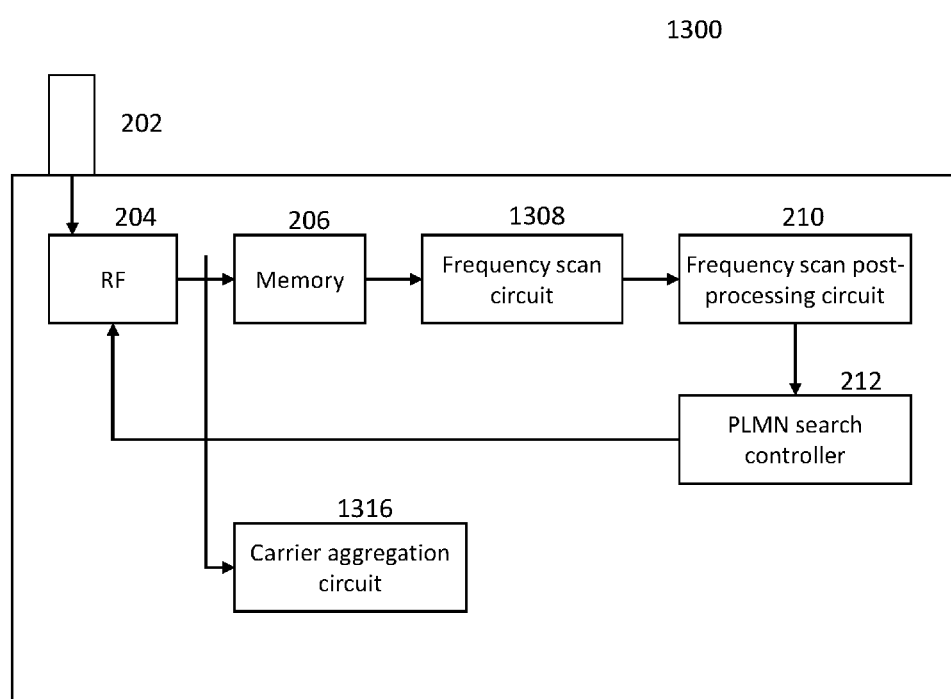
FIG. 13 shows various components and circuits of a mobile radio communication terminal device of FIG. 1.

FIG. 13 shows a UE 1300. Many of the components and circuits of UE 1300 correspond to UEs 102, 900, and 1100, such as antenna 202, RF transceiver 204, memory 206, frequency scan post-processing circuit 210, and PLMN search controller 212. Additionally, carrier aggregation circuit 1316 may be implemented in a substantially similar manner to carrier aggregation circuit 916 of UE 900. However, many different configurations of the components and circuits of UE 1300 are possible, and the disclosure is certainly not limiting in this or any respect.

Similarly to UEs 102, 900, and 1100, UE 1300 is a mobile radio communication terminal device configured to process received digitized signals. For example, frequency scan circuit 1308 may be configured to compare a received digitized signal with a plurality of pre-stored candidate mobile radio local reference signals in order to determine a plurality of cross-correlation coefficients. UE 1300 may also include a circuit or component such as carrier aggregation circuit 916, which may be configured to perform a carrier aggregation process for a mobile radio communication network based on the plurality of cross-correlation coefficients determined by frequency scan circuit 1308.

UE 1300 may operate on a mobile radio communication network such as LTE or LTE-A.

The predefined frequency scheme corresponding to the plurality of pre-stored candidate mobile radio local reference signals may be based on a plurality of carrier channels for a radio access network, such as on a set of EARFCNs associated with an LTE or LTE-A network.

A further exemplary aspect may include where one or more of the plurality of pre-stored candidate mobile radio local reference signals used by frequency scan circuit 1300 may be a plurality of synchronization sequences. For example, one or more of the plurality of synchronization sequences may be a plurality of PSSs.

The carrier aggregation process as executed by carrier aggregation circuit 916 may be based on the determination of one or more maximum cross-correlation coefficients of the determined plurality of cross-correlation coefficients. For example, carrier aggregation circuit 916 may be configured to identify one or more candidate carrier channels for use in the carrier aggregation process based on or more of the maximum cross-correlation coefficients. Carrier aggregation circuit 916 may select the candidate carrier channel from a plurality of predefined carrier channels based on one or more characteristic signal frequencies associated with the one or more maximum cross-correlation coefficients. An exemplary aspect may include where the carrier channel is selected from a possible set of EARFCNs.

As detailed in depth regarding FIG. 4, one or more of the plurality of pre-stored candidate mobile radio local reference signals utilized by frequency scan circuit 1308 may reflect a characteristic of a carrier channel for a radio access network. For example, a frequency characteristic of one or more of the plurality of pre-stored candidate mobile radio local reference signals may correspond to a frequency associated with a predefined carrier channel for a radio access network. At least one of the pre-stored candidate mobile radio local reference signals may differ from another of the plurality of pre-stored candidate mobile radio local reference signals according to a predefined frequency scheme, such as described regarding FIG. 4. Certain related exemplary aspects are described regarding FIG. 4, which discloses wherein one or more of the plurality of pre-stored candidate mobile radio local reference signals may be a predefined synchronization sequence rotated in frequency according to the predefined frequency scheme.

One or more of the plurality of pre-stored candidate mobile radio local reference signals utilized by frequency scan circuit 1308 may exhibit a degree of symmetry when transposed into the frequency domain. For example, a pair of the plurality of pre-stored candidate mobile radio local reference signals may be separated from each other by the same distance in frequency on the frequency axis as another pair of the plurality of pre-stored candidate mobile radio local reference signals. In other words, two of the plurality of pre-stored candidate mobile radio local reference signals may be separated in frequency by a distance $f_s$, while another two of the plurality of pre-stored candidate mobile radio local reference signals may also be separated by the same distance in frequency fs. The parameter $f_s$ may be in the range from e.g. about 10 kHz to 500 kHz.

The center frequencies of the pre-stored candidate mobile radio local reference signals may also correspond to center frequencies of a number of predefined carrier channels, e.g. as shown in FIG. 4.

UE 1300 may use intermediate values in substantially the same manner as UEs 102, 900, and 1100. For example, frequency scan circuit 1308 may determine a first cross-correlation coefficient using one or more intermediate values. Frequency scan circuit 1308 may also be configured to use one or more of the same intermediate values to determine a second cross-correlation coefficient.

UE 1300 may utilize intermediate values in the determination of cross-correlation coefficients. UE 1300 may use pre-stored candidate mobile radio local reference signals that exhibit a predefined relationship in order to calculate cross-correlation coefficients using intermediate values. At least two of the pre-stored candidate mobile radio local reference signals may be complex conjugates of each other. For example, the at least two pre-stored candidate mobile radio local reference signals may be PSS vectors that exhibit complex conjugacy.

Frequency scan circuit 1308 may be configured to process received digitized signal according to a target center frequency in order to utilize intermediate values in the determination of cross-correlation coefficients. Frequency scan circuit 1308 may then determine the plurality of cross-correlation coefficients based on the processed received digitized signal. For example, frequency scan circuit 1308 may select a target center frequency based on the pre-stored candidate mobile radio local reference signals that exhibit complex conjugacy. Frequency scan circuit 1308 may be further configured to select the target center frequency by identifying the midpoint on the frequency axis between the pre-stored candidate mobile radio local reference signals that are complex conjugates of each other.

The following examples pertain to further aspects of this disclosure:

Example 1 is a method of processing a received digitized signal. The method includes determining a plurality of cross-correlation coefficients for the received digitized signal, wherein each of the plurality of cross-correlation coefficients is determined by cross-correlating the received digitized signal with a respective candidate mobile radio local reference signal of a plurality of pre-stored candidate mobile radio local reference signals. The method further includes selecting one or more cross-correlation coefficients from the determined plurality of cross-correlation coefficients. The method further includes performing a mobile radio cell scan based on one or more selected cross-correlation coefficients to connect to a mobile radio communication network.

In Example 2, the subject matter of Example 1 can optionally include that the mobile radio communication network is a Long Term Evolution (LTE) network.

In Example 3, the subject matter of Example 2 can optionally include that the Long Term Evolution network is a Long Term Evolution Advanced (LTE-A) network.

In Example 4, the subject matter of Example 1 can optionally include wherein one or more of the plurality of pre-stored candidate mobile radio local reference signals are a plurality of synchronization sequences.

In Example 5, the subject matter of Example 4 can optionally include that one or more of the plurality of synchronization sequences are a plurality of Primary Synchronization Signals (PSSs).

In Example 6, the subject matter of Example 1 can optionally include wherein the one or more selected cross-correlation coefficients are selected by identifying one or more maximum values of the determined plurality of cross-correlation coefficients.

In Example 7, the subject matter of Example 6 can optionally include wherein a carrier channel is selected for the mobile radio cell scan based on the one or more selected cross-correlation coefficients.

In Example 8, the subject matter of Example 7 can optionally include the carrier channel is selected from a plurality of predefined carrier channels.

In Example 9, the subject matter of Example 8 can optionally include wherein one or more of the plurality of predefined carrier channels correspond to an Enhanced Universal Mobile Telecommunications System Radio Access Absolute Radio Frequency Channel Number (EAR-FCN).

In Example 10, the subject matter of Example 1 can optionally include wherein one or more of the plurality of pre-stored candidate mobile radio local reference signals reflect a characteristic of a carrier channel for a radio access network.

In Example 11, the subject matter of Example 10 can optionally include wherein a frequency characteristic of one or more of the plurality of pre-stored candidate mobile radio local reference signals correspond to a frequency associated with a predefined carrier channel for a radio access network.

In Example 12, the subject matter of Example 1 can optionally include wherein at least one of the plurality of pre-stored candidate mobile radio local reference signals differs from another of the plurality of pre-stored candidate mobile radio local reference signals according to a predefined frequency scheme.

In Example 13, the subject matter of Example 12 can optionally include wherein one or more of the plurality of pre-stored candidate mobile radio local reference signals comprise a predefined synchronization sequence rotated in frequency according to the predefined frequency scheme.

In Example 14, the subject matter of Example 13 can optionally include wherein at least a first pair of the plurality of pre-stored candidate mobile radio local reference signals differ from each other by the same frequency value as a second pair of the plurality of pre-stored candidate mobile radio local reference signals according to the predefined frequency scheme.

In Example 15, the subject matter of Example 14 can optionally include wherein the frequency value is in the range from about 10 kHz to about 500 kHz.

In Example 16, the subject matter of Example 12 can optionally include wherein at least one of the differences between candidate mobile radio local reference signals correspond to a difference between the center frequencies of a plurality of predefined carrier channels.

In Example 17, the subject matter of Example 12 can optionally include wherein a first cross-correlation coefficient is determined using one or more intermediate values, and wherein a second cross-correlation coefficient is determined using the one or more intermediate values.

In Example 18, the subject matter of Example 17 can optionally include wherein at least one of the intermediate values reflects a predefined relationship between at least two of the candidate mobile radio local reference signals.

In Example 19, the subject matter of Example 18 can optionally include wherein the at least two of the plurality of candidate mobile radio local reference signals are complex conjugates of each other.

In Example 20, the subject matter of Example 19 can optionally include wherein the at least two candidate mobile radio local reference signals are Primary Synchronization Signals (PSSs).

In Example 21, the subject matter of Example 18 can optionally include wherein the received digitized signal is processed based on a target center frequency and the plurality of cross-correlation coefficients are determined based on the processed received digitized signal.

In Example 22, the subject matter of Example 21 can optionally include wherein the target center frequency is selected based on at least two characteristic signal frequencies, each associated with one of the at least two candidate mobile radio local reference signals.

In Example 23, the subject matter of Example 22 can optionally include wherein the target center frequency is a midpoint between the at least two characteristic signal frequencies.

Example 24 is a mobile radio communication terminal device. The mobile radio communication terminal device includes at least one circuit configured to perform a method of processing received digitized signals, where the method includes determining a plurality of cross-correlation coefficients for the received digitized signal, wherein each of the plurality of cross-correlation coefficients is determined by cross-correlating the received digitized signal with a respective candidate mobile radio local reference signal out of a plurality of pre-stored candidate mobile radio local reference signals, selecting one or more cross-correlation coefficients from the determined plurality of cross-correlation coefficients, and performing a mobile radio cell scan based on one or more of the selected cross-correlation coefficients to connect to a mobile radio communication network.

In Example 25, the subject matter of Example 25 can optionally include wherein the mobile radio communication network is a Long Term Evolution (LTE) network.

In Example 26, the subject matter of Example 25 can optionally include wherein the Long Term Evolution network is a Long Term Evolution Advanced (LTE-A) network.

In Example 27, the subject matter of Example 24 can optionally include wherein one or more of the plurality of pre-stored candidate mobile radio local reference signals are a plurality of synchronization sequences.

In Example 28, the subject matter of Example 27 can optionally include wherein one or more of the synchronization sequences are a plurality of Primary Synchronization Signals (PSSs).

In Example 29, the subject matter of Example 24 can optionally include wherein the one or more selected cross-correlation coefficients are selected by identifying one or more maximum values of the determined plurality of cross-correlation coefficients.

In Example 30, the subject matter of Example 29 can optionally include wherein a carrier channel is selected for the mobile radio cell scan based on the one or more selected cross-correlation coefficients.

In Example 31, the subject matter of Example 30 can optionally include wherein the carrier channel is selected from a plurality of predefined carrier channels.

In Example 32, the subject matter of Example 31 can optionally include wherein one or more of the plurality of predefined carrier channels correspond to an Enhanced Universal Mobile Telecommunications System Radio Access Absolute Radio Frequency Channel Number (EAR-FCN).

In Example 33, the subject matter of Example 24 can optionally include wherein one or more of the plurality of pre-stored candidate mobile radio local reference signals reflect a characteristic of a carrier channel for a radio access network.

In Example 34, the subject matter of Example 33 can optionally include wherein a frequency characteristic of one or more of the plurality of pre-stored candidate mobile radio local reference signals correspond to a frequency associated with a predefined carrier channel for a radio access network.

In Example 35, the subject matter of Example 24 can optionally include wherein at least one of the plurality of pre-stored candidate mobile radio local reference signals differs from another of the plurality of pre-stored candidate mobile radio local reference signals according to a predefined frequency scheme.

In Example 36, the subject matter of Example 35 can optionally include wherein one or more of the plurality of pre-stored candidate mobile radio local reference signals include a predefined synchronization sequence rotated in frequency according to the predefined frequency scheme.

In Example 37, the subject matter of Example 36 can optionally include wherein at least a first pair of the plurality of pre-stored candidate mobile radio local reference signals differ from each other by the same frequency value as a second pair of the plurality of pre-stored candidate mobile radio local reference signals according to the predefined frequency scheme.

In Example 38, the subject matter of Example 37 can optionally include wherein the frequency value is in the range from about 10 kHz to about 500 kHz.

In Example 39, the subject matter of Example 35 can optionally include wherein at least one of the differences between candidate mobile radio local reference signals correspond to a difference between the center frequencies of a plurality of predefined carrier channels.

In Example 40, the subject matter of Example 35 can optionally include wherein a first cross-correlation coefficient is determined using one or more intermediate values, and wherein a second cross-correlation coefficient is determined using the one or more intermediate values.

In Example 41, the subject matter of Example 40 can optionally include wherein at least one of the intermediate values reflects a predefined relationship between at least two of the candidate mobile radio local reference signals.

In Example 42, the subject matter of Example 41 can optionally include wherein the at least two candidate mobile radio local reference signals are complex conjugates of each other.

In Example 43, the subject matter of Example 42 can optionally include wherein the at least two candidate mobile radio local reference signals are Primary Synchronization Signals (PSSs).

In Example 44, the subject matter of Example 41 can optionally include wherein the received digitized signal is processed based on a target center frequency and the plurality of cross-correlation coefficients are determined based on the processed received digitized signal.

In Example 45, the subject matter of Example 44 can optionally include wherein the target center frequency is selected based on at least two characteristic signal frequencies, each associated with one of at least two candidate mobile radio local reference signals.

In Example 46, the subject matter of Example 45 can optionally include wherein the target center frequency is a midpoint between the at least two characteristic signal frequencies.

Example 47 is a method of processing received digitized signals. The method includes determining a plurality of cross-correlation coefficients for the received digitized signal, wherein each of the plurality of cross-correlation coefficient is determined by cross-correlating the received digitized signal with a respective candidate mobile radio local reference signal out of a plurality of pre-stored candidate mobile radio local reference signals, selecting one or more cross-correlation coefficients from the determined plurality of cross-correlation coefficients, and performing a carrier aggregation process based on one or more of the selected cross-correlation coefficients to connect to a mobile radio communication network.

In Example 48, the subject matter of Example 47 can optionally include wherein the mobile radio communication network is a Long Term Evolution (LTE) network.

In Example 49, the subject matter of Example 48 can optionally include wherein the Long Term Evolution network is a Long Term Evolution Advanced (LTE-A) network.

In Example 50, the subject matter of Example 47 can optionally include wherein one or more of the plurality of pre-stored candidate mobile radio local reference signals are a plurality of synchronization sequences.

In Example 51, the subject matter of Example 50 can optionally include wherein one or more of the synchronization sequences are a plurality of Primary Synchronization Signals (PSSs).

In Example 52, the subject matter of Example 47 can optionally include wherein the one or more selected cross-correlation coefficients are selected by identifying one or more maximum values of the determined plurality of cross-correlation coefficients.

In Example 53, the subject matter of Example 52 can optionally include wherein a carrier channel is selected for the carrier aggregation process based on the one or more selected cross-correlation coefficients.

In Example 54, the subject matter of Example 53 can optionally include wherein the carrier channel is selected from a plurality of predefined carrier channels.

In Example 55, the subject matter of Example 54 can optionally include wherein one or more of the plurality of predefined carrier channels correspond to an Enhanced Universal Mobile Telecommunications System Radio Access Absolute Radio Frequency Channel Number (EARFCN).

In Example 56, the subject matter of Example 47 can optionally include wherein one or more of the plurality of pre-stored candidate mobile radio local reference signals reflect a characteristic of a carrier channel for a radio access network.

In Example 57, the subject matter of Example 56 can optionally include wherein a frequency characteristic of one or more of the plurality of pre-stored candidate mobile radio local reference signals correspond to a frequency associated with a predefined carrier channel for a radio access network.

In Example 58, the subject matter of Example 47 can optionally include wherein at least one of the plurality of pre-stored candidate mobile radio local reference signals differs from another of the plurality of pre-stored candidate mobile radio local reference signals according to a predefined frequency scheme.

In Example 59, the subject matter of Example 58 can optionally include wherein one or more of the plurality of pre-stored candidate mobile radio local reference signals include a predefined synchronization sequence rotated in frequency according to the predefined frequency scheme.

In Example 60, the subject matter of Example 59 can optionally include wherein at least a first pair of the plurality of pre-stored candidate mobile radio local reference signals differ from each other by the same frequency value as a second pair of the plurality of pre-stored candidate mobile radio local reference signals according to the predefined frequency scheme.

In Example 61, the subject matter of Example 60 can optionally include wherein the frequency value is in the range from about 10 kHz to about 500 kHz.

In Example 62, the subject matter of Example 58 can optionally include wherein at least one of the differences between candidate mobile radio local reference signals correspond to a difference between the center frequencies of a plurality of predefined carrier channels.

In Example 63, the subject matter of Example 58 can optionally include wherein a first cross-correlation coefficient is determined using one or more intermediate values, and wherein a second cross-correlation coefficient is determined using the one or more intermediate values.

In Example 64, the subject matter of Example 63 can optionally include wherein at least one of the intermediate values reflects a predefined relationship between two of the candidate mobile radio local reference signals.

In Example 65, the subject matter of Example 64 can optionally include wherein the two candidate mobile radio local reference signals are complex conjugates of each other.

In Example 66, the subject matter of Example 65 can optionally include wherein the two candidate mobile radio local reference signals are Primary Synchronization Signals (PSSs).

In Example 67, the subject matter of Example 64 can optionally include wherein the received digitized signal is processed based on a target center frequency and the plurality of cross-correlation coefficients are determined based on the processed received digitized signal.

In Example 68, the subject matter of Example 67 can optionally include wherein the target center frequency is selected based on at least two characteristic signal frequencies, each associated with one of the at least two candidate mobile radio local reference signals.

In Example 69, the subject matter of Example 68 can optionally include wherein the target center frequency is a midpoint between the at least two characteristic signal frequencies.

Example 70 is a mobile radio communication terminal device. The mobile radio communication terminal device includes at least one circuit configured to perform a method of processing received digitized signals, where the method includes determining a plurality of cross-correlation coefficients for the received digitized signal, wherein each of the plurality of cross-correlation coefficient is determined by cross-correlating the received digitized signal with a respective candidate mobile radio local reference signal out of a plurality of pre-stored candidate mobile radio local reference signals, selecting one or more cross-correlation coefficients from the determined plurality of cross-correlation coefficients, and performing a carrier aggregation process based on one or more of the selected cross-correlation coefficients to connect to a mobile radio communication network.

In Example 71, the subject matter of Example 70 can optionally include wherein the mobile radio communication network is a Long Term Evolution (LTE) network.

In Example 72, the subject matter of Example 71 can optionally include wherein the Long Term Evolution network is a Long Term Evolution Advanced (LTE-A) network.

In Example 73, the subject matter of Example 70 can optionally include wherein one or more of the plurality of pre-stored candidate mobile radio local reference signals are a plurality of synchronization sequences.

In Example 74, the subject matter of Example 73 can optionally include wherein one or more of the synchronization sequences are a plurality of Primary Synchronization Signals (PSSs).

In Example 75, the subject matter of Example 70 can optionally include wherein the one or more selected cross-correlation coefficients are selected by identifying one or more maximum values of the determined plurality of cross-correlation coefficients.

In Example 76, the subject matter of Example 75 can optionally include wherein a carrier channel is selected for the carrier aggregation process based on the one or more selected cross-correlation coefficients.

In Example 77, the subject matter of Example 76 can optionally include wherein the carrier channel is selected from a plurality of predefined carrier channels.

In Example 78, the subject matter of Example 77 can optionally include wherein one or more of the plurality of predefined carrier channels correspond to an Enhanced Universal Mobile Telecommunications System Radio Access Absolute Radio Frequency Channel Number (EARFCN).

In Example 79, the subject matter of Example 70 can optionally include wherein one or more of the plurality of pre-stored candidate mobile radio local reference signals reflect a characteristic of a carrier channel for a radio access network.

In Example 80, the subject matter of Example 79 can optionally include wherein a frequency characteristic of one or more of the plurality of pre-stored candidate mobile radio local reference signals correspond to a frequency associated with a predefined carrier channel for a radio access network.

In Example 81, the subject matter of Example 70 can optionally include wherein at least one of the plurality of pre-stored candidate mobile radio local reference signals differs from another of the plurality of pre-stored candidate mobile radio local reference signals according to a predefined frequency scheme.

In Example 82, the subject matter of Example 81 can optionally include wherein one or more of the plurality of pre-stored candidate mobile radio local reference signals include a predefined synchronization sequence rotated in frequency according to the predefined frequency scheme.

In Example 83, the subject matter of Example 82 can optionally include wherein at least a first pair of the plurality of pre-stored candidate mobile radio local reference signals differ from each other by the same frequency value as a second pair of the plurality of pre-stored candidate mobile radio local reference signals according to the predefined frequency scheme.

In Example 84, the subject matter of Example 83 can optionally include wherein the frequency value is in the range from about 10 kHz to about 500 kHz.

In Example 85, the subject matter of Example 81 can optionally include wherein at least one of the differences between candidate mobile radio local reference signals correspond to a difference between the center frequencies of a plurality of predefined carrier channels.

In Example 86, the subject matter of Example 81 can optionally include wherein a first cross-correlation coefficient is determined using one or more intermediate values, and wherein a second cross-correlation coefficient is determined using the one or more intermediate values.

In Example 87, the subject matter of Example 86 can optionally include wherein at least one of the intermediate values reflects a predefined relationship between at least two of the candidate mobile radio local reference signals.

In Example 88, the subject matter of Example 87 can optionally include wherein the at least two candidate mobile radio local reference signals are complex conjugates of each other.

In Example 89, the subject matter of Example 88 can optionally include wherein the at least two candidate mobile radio local reference signals are Primary Synchronization Signals (PSSs).

In Example 90, the subject matter of Example 87 can optionally include wherein the received digitized signal is processed based on a target center frequency and the plurality of cross-correlation coefficients are determined based on the processed received digitized signal.

In Example 91, the subject matter of Example 90 can optionally include wherein the target center frequency is selected based on at least two characteristic signal frequencies, each associated with one of the at least two candidate mobile radio local reference signals.

In Example 92, the subject matter of Example 91 can optionally include wherein the target center frequency is a midpoint between the at least two characteristic signal frequencies.

Example 93 is a method of processing received digitized signals. The method includes comparing the received digitized signal with at least one of a plurality of pre-stored candidate mobile radio local reference signals to determine a plurality of cross-correlation coefficients and performing a mobile radio cell scan for a mobile radio communication network based on the determined plurality of cross-correlation coefficients.

In Example 94, the subject matter of Example 93 can optionally include wherein the mobile radio communication network is a Long Term Evolution (LTE) network.

In Example 95, the subject matter of Example 94 can optionally include wherein the Long Term Evolution network is a Long Term Evolution Advanced (LTE-A) network.

In Example 96, the subject matter of Example 93 can optionally include wherein the predefined frequency scheme is based on a plurality of carrier channels for a radio access network.

In Example 97, the subject matter of Example 93 can optionally include wherein one or more of the plurality of pre-stored candidate mobile radio local reference signals are a plurality of synchronization sequences.

In Example 98, the subject matter of Example 97 can optionally include wherein one or more of the synchronization sequences are a plurality of Primary Synchronization Signals (PSSs).

In Example 99, the subject matter of Example 93 can optionally include wherein the mobile radio cell scan is based on the determination of one or more maximum cross-correlation coefficients of the determined plurality of cross-correlation coefficients.

In Example 100, the subject matter of Example 99 can optionally include wherein a carrier channel is selected for the mobile radio cell scan based on the one or more maximum cross-correlation coefficients.

In Example 101, the subject matter of Example 100 can optionally include wherein the carrier channel is selected from a plurality of pre-stored carrier channels based on one or more characteristic signal frequencies associated with the one or more maximum cross-correlation coefficients.

In Example 102, the subject matter of Example 101 can optionally include wherein one or more of the plurality of predefined carrier channels correspond to an Enhanced Universal Mobile Telecommunications System Radio Access Absolute Radio Frequency Channel Number (EARFCN).

In Example 103, the subject matter of Example 93 can optionally include wherein one or more of the plurality of pre-stored candidate mobile radio local reference signals reflect a characteristic of a carrier channel for a radio access network.

In Example 104, the subject matter of Example 103 can optionally include wherein a frequency characteristic of one or more of the plurality of pre-stored candidate mobile radio local reference signals correspond to a frequency associated with a predefined carrier channel for a radio access network.

In Example 105, the subject matter of Example 93 can optionally include wherein at least one of the plurality of pre-stored candidate mobile radio local reference signals differs from another of the plurality of pre-stored candidate mobile radio local reference signals according to a predefined frequency scheme.

In Example 106, the subject matter of Example 105 can optionally include wherein one or more of the plurality of pre-stored candidate mobile radio local reference signals include a predefined synchronization sequence rotated in frequency according to the predefined frequency scheme.

In Example 107, the subject matter of Example 106 can optionally include wherein at least a first pair of the plurality of pre-stored candidate mobile radio local reference signals differ from each other by the same frequency value as a second pair of the plurality of pre-stored candidate mobile radio local reference signals according to the predefined frequency scheme.

In Example 108, the subject matter of Example 107 can optionally include wherein the frequency value is in the range from about 10 kHz to about 500 kHz.

In Example 109, the subject matter of Example 105 can optionally include wherein at least one of the differences between pre-stored candidate mobile radio local reference signals correspond to a difference between the center frequencies of a plurality of predefined carrier channels.

In Example 110, the subject matter of Example 105 can optionally include wherein a first cross-correlation coefficient is determined using one or more intermediate values, and wherein a second cross-correlation coefficient is determined using the one or more intermediate values.

In Example 111, the subject matter of Example 110 can optionally include wherein at least one of the intermediate values reflects a predefined relationship between at least two of the pre-stored candidate mobile radio local reference signals.

In Example 112, the subject matter of Example 111 can optionally include wherein the at least two pre-stored candidate mobile radio local reference signals are complex conjugates of each other.

In Example 113, the subject matter of Example 112 can optionally include wherein the at least two pre-stored candidate mobile radio local reference signals are Primary Synchronization Signals (PSSs).

In Example 114, the subject matter of Example 111 can optionally include wherein the received digitized signal is processed based on a target center frequency and the plurality of cross-correlation coefficients are determined based on the processed received digitized signal.

In Example 115, the subject matter of Example 114 can optionally include wherein the target center frequency is selected based on at least two characteristic signal frequencies, each associated with one of the at least two pre-stored candidate mobile radio local reference signals.

In Example 116, the subject matter of Example 115 can optionally include wherein the target center frequency is a midpoint between the at least two characteristic signal frequencies.

Example 117 is a mobile radio communication terminal device. The mobile radio communication terminal device includes at least one circuit configured to perform a method of processing received digitized signals, where the method includes comparing the received digitized signal with at least one of a plurality of pre-stored candidate mobile radio local reference signals to determine a plurality of cross-correlation coefficients, and performing a mobile radio cell scan for a mobile radio communication network based on the determined plurality of cross-correlation coefficients.

In Example 118, the subject matter of Example 117 can optionally include wherein the mobile radio communication network is a Long Term Evolution (LTE) network.

In Example 119, the subject matter of Example 118 can optionally include wherein the Long Term Evolution network is a Long Term Evolution Advanced (LTE-A) network.

In Example 120, the subject matter of Example 117 can optionally include wherein the predefined frequency scheme is based on a plurality of carrier channels for a radio access network.

In Example 121, the subject matter of Example 117 can optionally include wherein one or more of the plurality of pre-stored candidate mobile radio local reference signals are a plurality of synchronization sequences.

In Example 122, the subject matter of Example 121 can optionally include wherein one or more of the synchronization sequences are a plurality of Primary Synchronization Signals (PSSs).

In Example 123, the subject matter of Example 117 can optionally include wherein the mobile radio cell scan is based on the determination of one or more maximum cross-correlation coefficients of the determined plurality of cross-correlation coefficients.

In Example 124, the subject matter of Example 123 can optionally include wherein a carrier channel is selected for the mobile radio cell scan based on the one or more maximum cross-correlation coefficients.

In Example 125, the subject matter of Example 124 can optionally include wherein the carrier channel is selected from a plurality of predefined carrier channels based on one or more characteristic signal frequencies associated with the one or more maximum cross-correlation coefficients.

In Example 126, the subject matter of Example 125 can optionally include wherein one or more of the plurality of predefined carrier channels correspond to an Enhanced Universal Mobile Telecommunications System Radio Access Absolute Radio Frequency Channel Number (EAR-FCN).

In Example 127, the subject matter of Example 117 can optionally include wherein one or more of the plurality of pre-stored candidate mobile radio local reference signals reflect a characteristic of a carrier channel for a radio access network.

In Example 128, the subject matter of Example 127 can optionally include wherein a frequency characteristic of one or more of the plurality of pre-stored candidate mobile radio local reference signals correspond to a frequency associated with a predefined carrier channel for a radio access network.

In Example 129, the subject matter of Example 117 can optionally include wherein at least one of the plurality of pre-stored candidate mobile radio local reference signals differs from another of the plurality of pre-stored candidate mobile radio local reference signals according to a predefined frequency scheme.

In Example 130, the subject matter of Example 129 can optionally include wherein one or more of the plurality of pre-stored candidate mobile radio local reference signals include a predefined synchronization sequence rotated in frequency according to the predefined frequency scheme.

In Example 131, the subject matter of Example 130 can optionally include wherein at least a first pair of the plurality of pre-stored candidate mobile radio local reference signals differ from each other by the same frequency value as a second pair of the plurality of pre-stored candidate mobile radio local reference signals according to the predefined frequency scheme.

In Example 132, the subject matter of Example 131 can optionally include wherein the frequency value is in the range from about 10 kHz to about 500 kHz.

In Example 133, the subject matter of Example 129 can optionally include wherein at least one of the differences between pre-stored candidate mobile radio local reference signals correspond to a difference between the center frequencies of a plurality of predefined carrier channels.

In Example 134, the subject matter of Example 129 can optionally include wherein a first cross-correlation coefficient is determined using one or more intermediate values, and wherein a second cross-correlation coefficient is determined using the one or more intermediate values.

In Example 135, the subject matter of Example 134 can optionally include wherein at least one of the intermediate values reflects a predefined relationship between at least two of the pre-stored candidate mobile radio local reference signals.

In Example 136, the subject matter of Example 135 can optionally include wherein the at least two pre-stored candidate mobile radio local reference signals are complex conjugates of each other.

In Example 137, the subject matter of Example 136 can optionally include wherein the at least two pre-stored candidate mobile radio local reference signals are Primary Synchronization Signals (PSSs).

In Example 138, the subject matter of Example 135 can optionally include wherein the received digitized signal is processed based on a target center frequency and the plurality of cross-correlation coefficients are determined based on the processed received digitized signal.

In Example 139, the subject matter of Example 138 can optionally include wherein the target center frequency is selected based on at least two characteristic signal frequencies, each associated with one of the at least two pre-stored candidate mobile radio local reference signals.

In Example 140, the subject matter of Example 139 can optionally include wherein the target center frequency is a midpoint between the at least two characteristic signal frequencies.

Example 141 is a method of processing a received digitized signal. The method includes comparing the received digitized signal with at least one of a plurality of pre-stored candidate mobile radio local reference signals to determine a plurality of cross-correlation coefficients, and performing a mobile radio cell scan for a mobile radio communication network based on the determined plurality of cross-correlation coefficients.

In Example 142, the subject matter of Example 141 can optionally include wherein the mobile radio communication network is a Long Term Evolution (LTE) network.

In Example 143, the subject matter of Example 142 can optionally include wherein the Long Term Evolution network is a Long Term Evolution Advanced (LTE-A) network.

In Example 144, the subject matter of Example 141 can optionally include wherein the Long Term Evolution network is a Long Term Evolution Advanced (LTE-A) network.

In Example 145, the subject matter of Example 141 can optionally include wherein one or more of the plurality of pre-stored candidate mobile radio local reference signals are a plurality of synchronization sequences.

In Example 146, the subject matter of Example 145 can optionally include wherein one or more of the synchronization sequences are a plurality of Primary Synchronization Signals (PSSs).

In Example 147, the subject matter of Example 141 can optionally include wherein the carrier aggregation process is based on the determination of one or more maximum cross-correlation coefficients of the determined plurality of cross-correlation coefficients.

In Example 148, the subject matter of Example 147 can optionally include wherein a carrier channel is selected for the carrier aggregation process based on the one or more maximum cross-correlation coefficients.

In Example 149, the subject matter of Example 148 can optionally include wherein the carrier channel is selected from a plurality of predefined carrier channels based on one or more characteristic signal frequencies associated with the one or more maximum cross-correlation coefficients.

In Example 150, the subject matter of Example 149 can optionally include wherein one or more of the plurality of predefined carrier channels correspond to an Enhanced Universal Mobile Telecommunications System Radio Access Absolute Radio Frequency Channel Number (EARFCN).

In Example 151, the subject matter of Example 141 can optionally include wherein one or more of the plurality of pre-stored candidate mobile radio local reference signals reflect a characteristic of a carrier channel for a radio access network.

In Example 152, the subject matter of Example 151 can optionally include wherein a frequency characteristic of one or more of the plurality of pre-stored candidate mobile radio local reference signals correspond to a frequency associated with a predefined carrier channel for a radio access network.

In Example 153, the subject matter of Example 141 can optionally include wherein at least one of the plurality of pre-stored candidate mobile radio local reference signals differs from another of the plurality of pre-stored candidate mobile radio local reference signals according to a predefined frequency scheme.

In Example 154, the subject matter of Example 153 can optionally include wherein one or more of the plurality of pre-stored candidate mobile radio local reference signals include a predefined synchronization sequence rotated in frequency according to the predefined frequency scheme.

In Example 155, the subject matter of Example 154 can optionally include wherein at least a first pair of the plurality of pre-stored candidate mobile radio local reference signals differ from each other by the same frequency value as a second pair of the plurality of pre-stored candidate mobile radio local reference signals according to the predefined frequency scheme.

In Example 156, the subject matter of Example 155 can optionally include wherein the frequency value is in the range from about 10 kHz to about 500 kHz.

In Example 157, the subject matter of Example 153 can optionally include wherein at least one of the differences between candidate mobile radio local reference signals correspond to a difference between the center frequencies of a plurality of predefined carrier channels.

In Example 158, the subject matter of Example 153 can optionally include wherein a first cross-correlation coefficient is determined using one or more intermediate values and wherein a second cross-correlation coefficient is determined using the one or more intermediate values.

In Example 159, the subject matter of Example 158 can optionally include wherein at least one of the intermediate values reflects a predefined relationship between at least two of the candidate mobile radio local reference signals.

In Example 160, the subject matter of Example 159 can optionally include wherein the at least two candidate mobile radio local reference signals are complex conjugates of each other.

In Example 161, the subject matter of Example 160 can optionally include wherein the at least two candidate mobile radio local reference signals are Primary Synchronization Signals (PSSs).

In Example 162, the subject matter of Example 159 can optionally include wherein the received digitized signal is processed based on a target center frequency and the plurality of cross-correlation coefficients are determined based on the processed received digitized signal.

In Example 163, the subject matter of Example 162 can optionally include wherein the target center frequency is selected based on at least two characteristic signal frequencies, each associated with one of the at least two candidate mobile radio local reference signals.

In Example 164, the subject matter of Example 163 can optionally include wherein the target center frequency is a midpoint between the at least two characteristic signal frequencies.

Example 165 is a mobile radio communication terminal device. The mobile radio communication terminal device includes at least one circuit configured to perform a method of processing received digitized signals, where the method includes comparing the received digitized signal with at least one of a plurality of pre-stored candidate mobile radio local reference signals to determine a plurality of cross-correlation coefficients, and performing a carrier aggregation process for a mobile radio communication network based on the determined plurality of cross-correlation coefficients.

In Example 166, the subject matter of Example 165 can optionally include wherein the mobile radio communication network is a Long Term Evolution (LTE) network.

In Example 167, the subject matter of Example 166 can optionally include wherein the Long Term Evolution network is a Long Term Evolution Advanced (LTE-A) network.

In Example 168, the subject matter of Example 165 can optionally include wherein the predefined frequency scheme is based on a plurality of carrier channels for a radio access network.

In Example 169, the subject matter of Example 165 can optionally include wherein one or more of the plurality of pre-stored candidate mobile radio local reference signals are a plurality of synchronization sequences.

In Example 170, the subject matter of Example 169 can optionally include wherein one or more of the synchronization sequences are a plurality of Primary Synchronization Signals (PSSs).

In Example 171, the subject matter of Example 165 can optionally include wherein the carrier aggregation process is based on the determination of one or more maximum cross-correlation coefficients of the determined plurality of cross-correlation coefficients.

In Example 172, the subject matter of Example 171 can optionally include wherein a carrier channel is selected for the carrier aggregation process based on the one or more maximum cross-correlation coefficients.

In Example 173, the subject matter of 172 can optionally include wherein the carrier channel is selected from a plurality of predefined carrier channels based on one or more characteristic signal frequencies associated with the one or more maximum cross-correlation coefficients.

In Example 174, the subject matter of Example 173 can optionally include wherein one or more of the plurality of predefined carrier channels correspond to an Enhanced Universal Mobile Telecommunications System Radio Access Absolute Radio Frequency Channel Number (EARFCN).

In Example 175, the subject matter of Example 165 can optionally include wherein one or more of the plurality of pre-stored candidate mobile radio local reference signals reflect a characteristic of a carrier channel for a radio access network.

In Example 176, the subject matter of Example 175 can optionally include wherein a frequency characteristic of one or more of the plurality of pre-stored candidate mobile radio local reference signals correspond to a frequency associated with a predefined carrier channel for a radio access network.

In Example 177, the subject matter of Example 165 can optionally include wherein at least one of the plurality of pre-stored candidate mobile radio local reference signals differs from another of the plurality of pre-stored candidate mobile radio local reference signals according to a predefined frequency scheme.

In Example 178, the subject matter of Example 177 can optionally include wherein one or more of the plurality of pre-stored candidate mobile radio local reference signals include a predefined synchronization sequence rotated in frequency according to the predefined frequency scheme.

In Example 179, the subject matter of Example 178 can optionally include wherein at least a first pair of the plurality of pre-stored candidate mobile radio local reference signals differ from each other by the same frequency value as a second pair of the plurality of pre-stored candidate mobile radio local reference signals according to the predefined frequency scheme.

In Example 180, the subject matter of Example 179 can optionally include wherein the frequency value is in the range from about 10 kHz to about 500 kHz.

In Example 181, the subject matter of Example 177 can optionally include wherein at least one of the differences between candidate mobile radio local reference signals correspond to a difference between the center frequencies of a plurality of predefined carrier channels.

In Example 182, the subject matter of Example 177 can optionally include wherein a first cross-correlation coefficient is determined using one or more intermediate values, and wherein a second cross-correlation coefficient is determined using the one or more intermediate values.

In Example 183, the subject matter of Example 182 can optionally include wherein at least one of the intermediate values reflects a predefined relationship between at least two of the candidate mobile radio local reference signals.

In Example 184, the subject matter of Example 183 can optionally include wherein the at least two candidate mobile radio local reference signals are complex conjugates of each other.

In Example 185, the subject matter of Example 184 can optionally include wherein the at least two candidate mobile radio local reference signals are Primary Synchronization Signals (PSSs).

In Example 186, the subject matter of Example 183 can optionally include wherein the received digitized signal is processed based on a target center frequency and the plurality of cross-correlation coefficients are determined based on the processed received digitized signal.

In Example 187, the subject matter of Example 186 can optionally include wherein the target center frequency is selected based on at least two characteristic signal frequencies, each associated with one of the at least two candidate mobile radio local reference signals.

In Example 188, the subject matter of Example 187 can optionally include wherein the target center frequency is a midpoint between the at least two characteristic signal frequencies.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile radio communication terminal device, comprising at least one circuit configured to perform a method of processing received digitized signals, the method comprising:
   determining a plurality of cross-correlation coefficients for a received digitized signal, wherein each of the plurality of cross-correlation coefficients is determined by cross-correlating the received digitized signal with a respective pre-stored candidate mobile radio local reference signal out of a plurality of pre-stored candidate mobile radio local reference signals and wherein at least two of the pre-stored candidate mobile radio local reference signals are pre-rotated to be centered at different predefined carrier channel center frequencies;
   selecting one or more cross-correlation coefficients from the determined plurality of cross-correlation coefficients; and
   performing a mobile radio cell scan based on one or more of the selected cross-correlation coefficients to connect to a mobile radio communication network.

2. The mobile radio communication terminal device of claim 1,
   wherein the one or more selected cross-correlation coefficients are selected by identifying one or more maximum values of the determined plurality of cross-correlation coefficients.

3. The mobile radio communication terminal device of claim 2,
   wherein a carrier channel is selected for the mobile radio cell scan based on the one or more selected cross-correlation coefficients.

4. The mobile radio communication terminal device of claim 1,
   wherein a first cross-correlation coefficient is determined using one or more intermediate values; and
   wherein a second cross-correlation coefficient is determined using the one or more intermediate values.

5. The mobile radio communication terminal device of claim 4, wherein at least one of the intermediate values reflects a predefined relationship between the at least two of the pre-stored candidate mobile radio local reference signals.

6. The mobile radio communication terminal device of claim 5,
wherein the at least two of the pre-stored candidate mobile radio local reference signals are complex conjugates of each other.

7. The mobile radio communication terminal device of claim 5,
wherein the received digitized signal is processed based on a target center frequency and the plurality of cross-correlation coefficients are determined based on the processed received digitized signal.

8. A mobile radio communication terminal device, comprising at least one circuit configured to perform a method of processing received digitized signals, the method comprising:
determining a plurality of cross-correlation coefficients for a received digitized signal, wherein each of the plurality of cross-correlation coefficients is determined by cross-correlating the received digitized signal with a respective pre-stored candidate mobile radio local reference signal out of a plurality of pre-stored candidate mobile radio local reference signals and wherein at least two of the pre-stored candidate mobile radio local reference signals are pre-rotated to be centered at different predefined carrier channel center frequencies;
selecting one or more cross-correlation coefficients from the determined plurality of cross-correlation coefficients; and
performing a carrier aggregation process based on one or more of the selected cross-correlation coefficients to connect to a mobile radio communication network.

9. The mobile radio communication terminal device of claim 8,
wherein the one or more selected cross-correlation coefficients are selected by identifying one or more maximum values of the determined plurality of cross-correlation coefficients.

10. The mobile radio communication terminal device of claim 9,
wherein a carrier channel is selected for the carrier aggregation process based on the one or more selected cross-correlation coefficients.

11. The mobile radio communication terminal device of claim 8,
wherein a first cross-correlation coefficient is determined using one or more intermediate values; and
wherein a second cross-correlation coefficient is determined using the one or more intermediate values.

12. The mobile radio communication terminal device of claim 11, wherein at least one of the intermediate values reflects a predefined relationship between the at least two of the pre-stored candidate mobile radio local reference signals.

13. A mobile radio communication terminal device, comprising at least one circuit configured to perform a method of processing received digitized signals, the method comprising:
comparing a received digitized signal with each of a plurality of pre-stored candidate mobile radio local reference signals to determine a plurality of cross-correlation coefficients, wherein at least two of the pre-stored candidate mobile radio local reference signals are pre-rotated to be centered at different predefined carrier channel center frequencies; and
performing a mobile radio cell scan for a mobile radio communication network based on the determined plurality of cross-correlation coefficients.

14. The mobile radio communication terminal device of claim 13,
wherein a first cross-correlation coefficient is determined using one or more intermediate values; and
wherein a second cross-correlation coefficient is determined using the one or more intermediate values.

15. The mobile radio communication terminal device of claim 14,
wherein the received digitized signal is processed based on a target center frequency and the plurality of cross-correlation coefficients are determined based on the processed received digitized signal.

* * * * *